(12) United States Patent
Hall et al.

(10) Patent No.: US 10,707,805 B2
(45) Date of Patent: Jul. 7, 2020

(54) ROOFING UNDERLAYMENT FOR SOLAR SHINGLES

(71) Applicant: Hall Labs LLC, Provo, UT (US)

(72) Inventors: David R. Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/299,432

(22) Filed: Mar. 12, 2019

(65) Prior Publication Data

US 2019/0214939 A1 Jul. 11, 2019

Related U.S. Application Data

(63) Continuation-in-part of application No. 16/226,646, filed on Dec. 20, 2018, and a continuation-in-part of application No. 16/226,649, filed on Dec. 20, 2018, and a continuation-in-part of application No. 15/391,347, filed on Dec. 27, 2016, now abandoned.

(51) Int. Cl.
*H02S 20/25* (2014.01)
*H02S 20/24* (2014.01)
*E04B 7/18* (2006.01)
*H02S 20/23* (2014.01)

(52) U.S. Cl.
CPC ............. *H02S 20/25* (2014.12); *E04B 7/18* (2013.01); *H02S 20/23* (2014.12); *H02S 20/24* (2014.12)

(58) Field of Classification Search
CPC .......... H02S 20/25; H02S 20/24; H02S 20/23; E04B 7/18

USPC ........................................................ 52/173.3
See application file for complete search history.

(56) References Cited

U.S. PATENT DOCUMENTS

| | | | | |
|---|---|---|---|---|
| 4,321,416 A | * | 3/1982 | Tennant | H01L 31/05 136/244 |
| 4,860,509 A | * | 8/1989 | Laaly | H01L 31/03926 52/173.3 |
| 5,990,414 A | * | 11/1999 | Posnansky | H01L 31/048 136/244 |
| 6,063,996 A | * | 5/2000 | Takada | H01L 31/048 136/246 |
| 6,111,189 A | * | 8/2000 | Garvison | H01L 31/02008 136/244 |

(Continued)

*Primary Examiner* — Patrick J Maestri
*Assistant Examiner* — Joseph J. Sadlon

(57) ABSTRACT

The invention is a roofing underlayment for solar shingles that includes a water-impervious membrane adapted to be attached to a roof. The underlayment also includes a mechanical attachment member having a mechanical first portion embedded within the membrane and having a mechanical second portion extending above the membrane, wherein the mechanical second portion of the mechanical attachment member is configured to mechanically attach a solar shingle to the roof. The underlayment also includes an electrical conductor having an electrical first portion of which is embedded within the membrane, having an electrical second portion which is configured to electrically connect to a solar shingle, and having an electrical third portion which is configured to electrically connect to an electrical circuit. An air gap area is also provided that allows for air flow below the solar shingles. The air gap area comprises an area between a bottom surface of the solar shingles and a top surface of the membrane.

20 Claims, 21 Drawing Sheets

(56) References Cited

U.S. PATENT DOCUMENTS

| | | | | |
|---|---|---|---|---|
| 6,182,404 B1* | 2/2001 | Rinklake | ............... | E04D 1/36 52/173.3 |
| 6,288,326 B1* | 9/2001 | Hayashi | ............ | B32B 17/10009 136/244 |
| 6,546,535 B1* | 4/2003 | Nagao | ............... | G06F 11/2035 716/120 |
| 6,576,830 B2* | 6/2003 | Nagao | ............... | H02S 20/23 136/244 |
| 6,936,329 B2* | 8/2005 | Kiik | ............... | A47G 27/0468 428/141 |
| 7,642,449 B2* | 1/2010 | Korman | ............... | E04D 3/38 136/244 |
| 7,678,991 B2* | 3/2010 | McCaskill | ............ | H02S 40/34 |
| 7,861,478 B2* | 1/2011 | Kalkanoglu | ............ | B32B 15/08 52/408 |
| 8,091,847 B2* | 1/2012 | Schnitzer | ............... | F24S 25/65 248/309.1 |
| 8,191,320 B2* | 6/2012 | Mittan | ............... | H01L 31/048 136/251 |
| 8,273,980 B2* | 9/2012 | Farquhar | ............ | H01L 31/0547 136/251 |
| 8,613,169 B2* | 12/2013 | Sherman | ............... | H01L 31/05 52/173.3 |
| 8,776,455 B2* | 7/2014 | Azoulay | ............... | H02S 20/25 52/173.3 |
| 8,904,718 B2* | 12/2014 | Schick | ............... | F24S 25/40 52/173.3 |
| 8,911,264 B2* | 12/2014 | Goyal | ............... | F24S 25/40 52/173.3 |
| 8,935,893 B2* | 1/2015 | Liu | ............... | H02J 5/005 307/104 |
| 8,994,224 B2* | 3/2015 | Mehta | ............... | H02J 5/005 307/104 |
| 9,228,356 B2* | 1/2016 | Edwards | ............... | E04D 1/24 |
| 9,273,885 B2* | 3/2016 | Rodrigues | ............ | H01L 31/05 136/244 |
| 9,825,461 B2* | 11/2017 | Hodrinsky | ............... | H02J 1/14 |
| 10,027,275 B2* | 7/2018 | Friedrich | ............... | F24S 20/69 |
| 10,088,201 B2* | 10/2018 | Stephan | ............... | H02S 20/23 |
| 10,211,355 B2* | 2/2019 | Itami | ............... | H01L 31/048 |
| 10,429,100 B2* | 10/2019 | Zabel | ............... | F24S 25/67 |
| 10,469,023 B2* | 11/2019 | Stearns | ............... | H02S 20/24 |
| 10,511,250 B2* | 12/2019 | Wylie | ............... | E04D 13/103 |
| 2006/0032527 A1* | 2/2006 | Stevens | ............... | H01L 31/048 136/251 |
| 2011/0047902 A1* | 3/2011 | Cryar | ............... | E04D 1/26 52/173.3 |
| 2013/0212959 A1* | 8/2013 | Lopez | ............... | H02S 20/25 52/173.3 |
| 2017/0237390 A1* | 8/2017 | Hudson | ............... | E04D 1/24 |
| 2018/0054160 A1* | 2/2018 | Krishnamoorthy | ..... | H02S 40/34 |

* cited by examiner

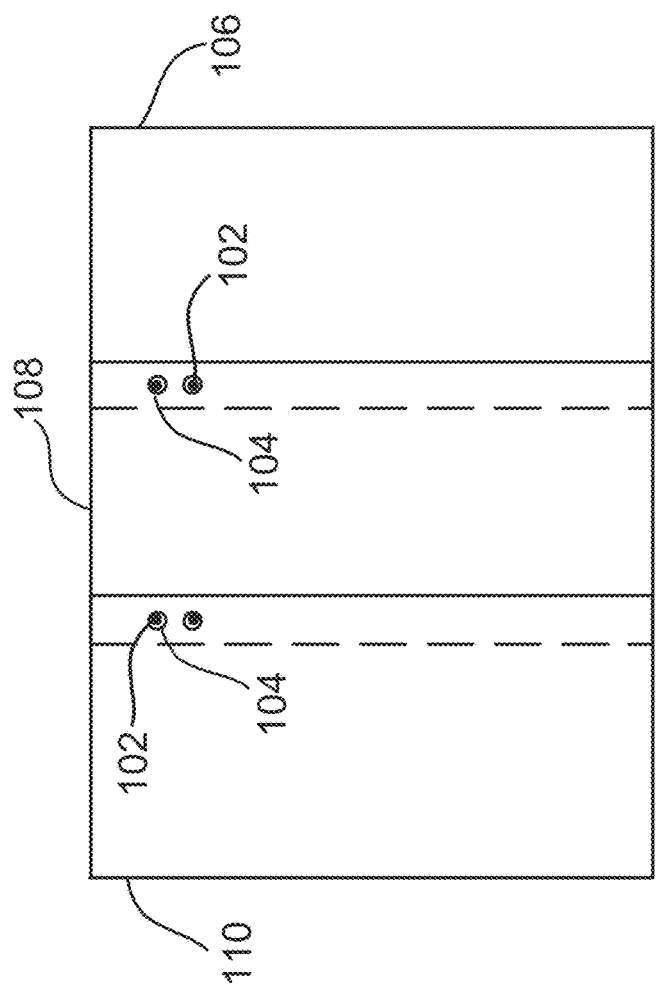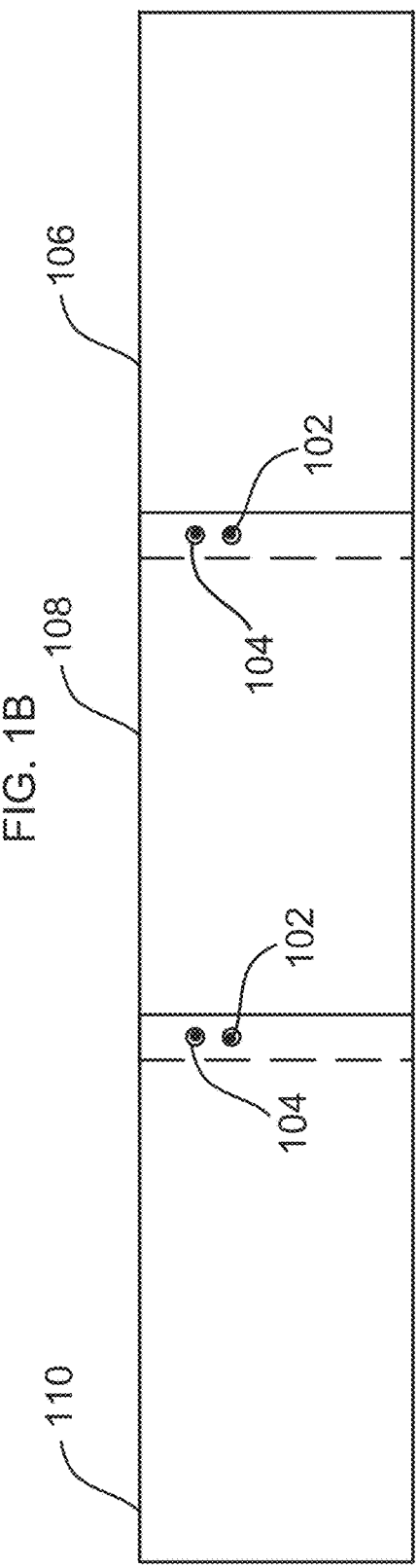

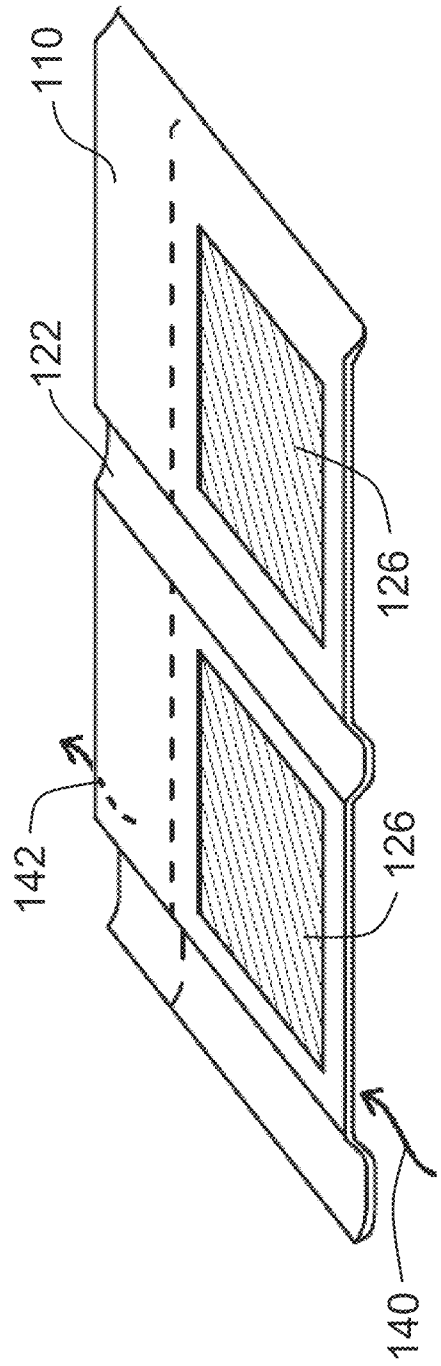
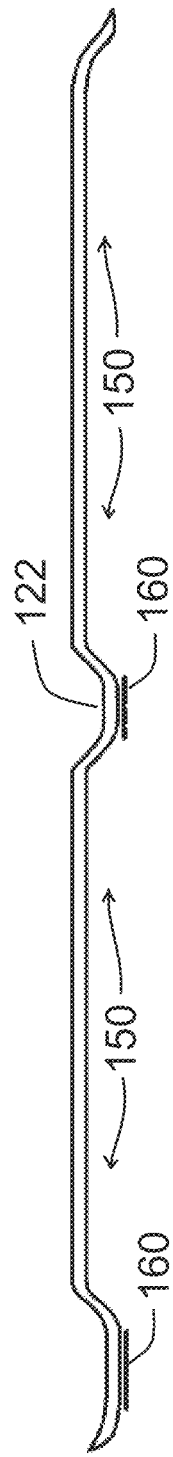

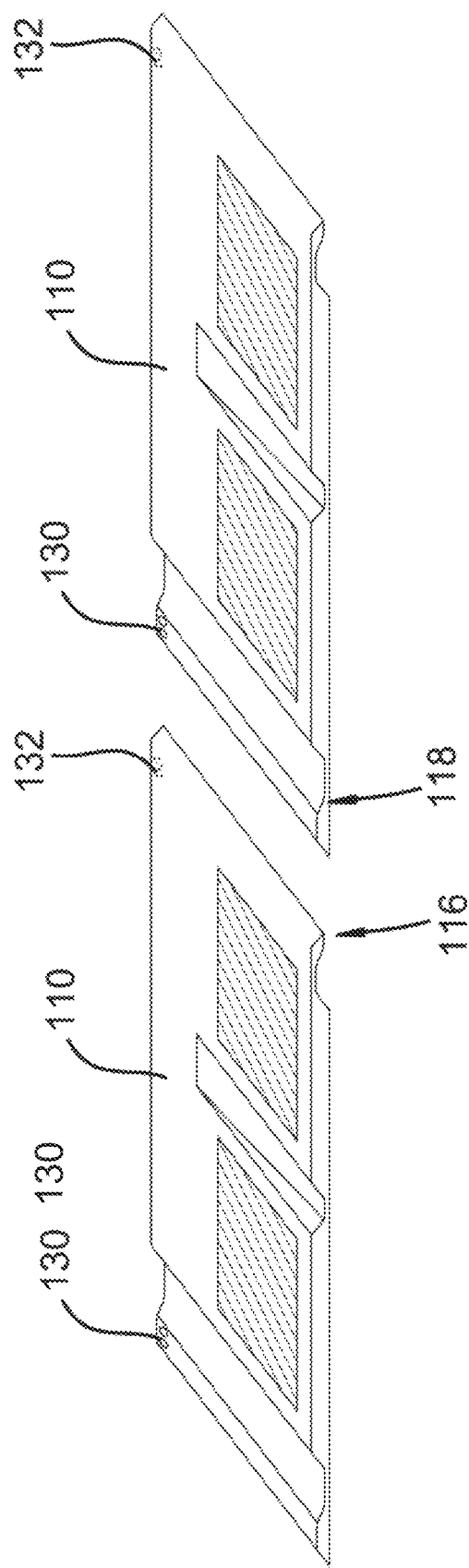
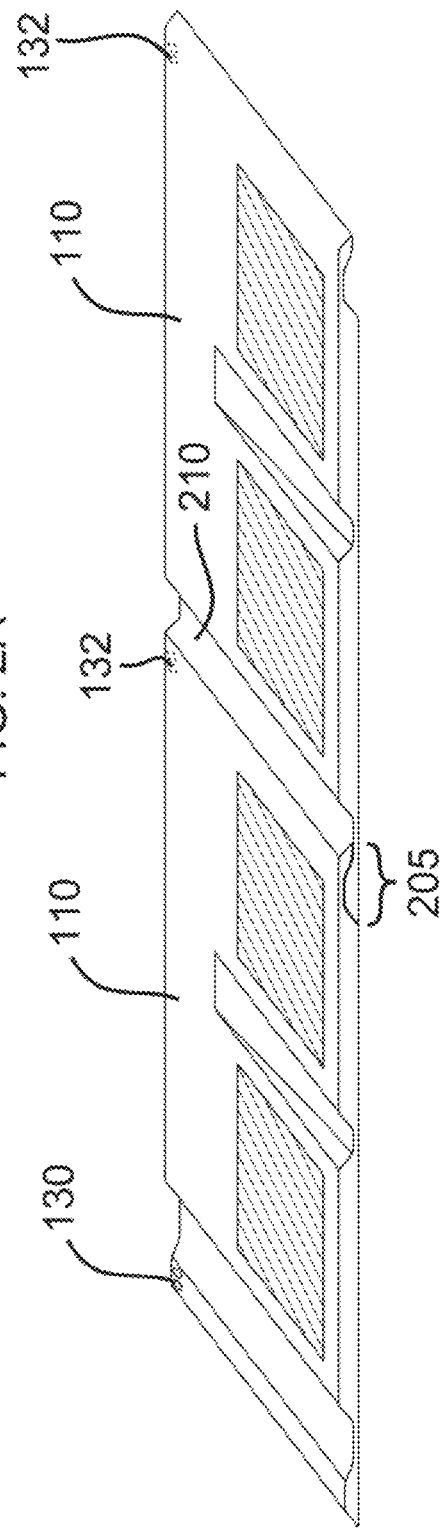
FIG. 2A
FIG. 2B

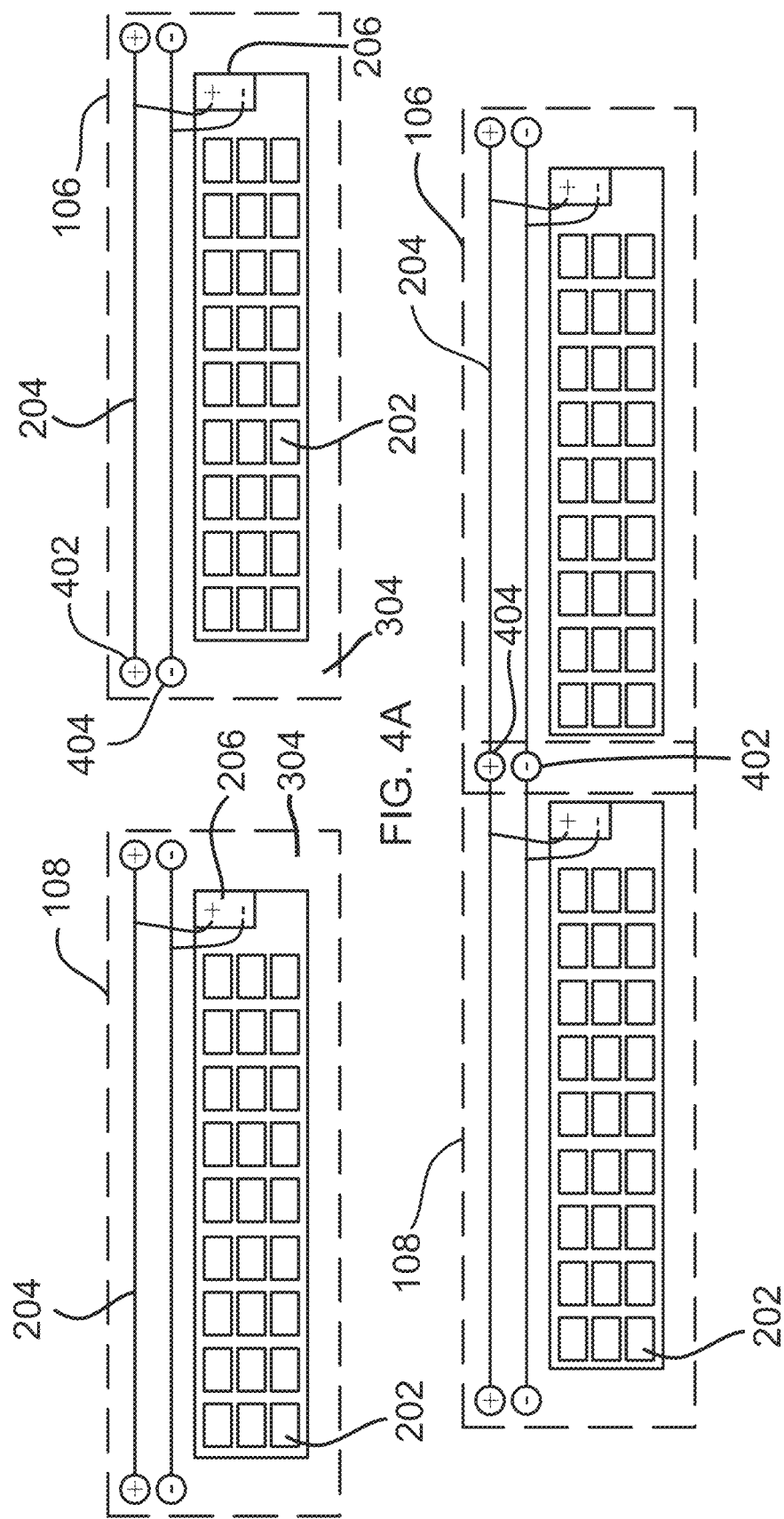

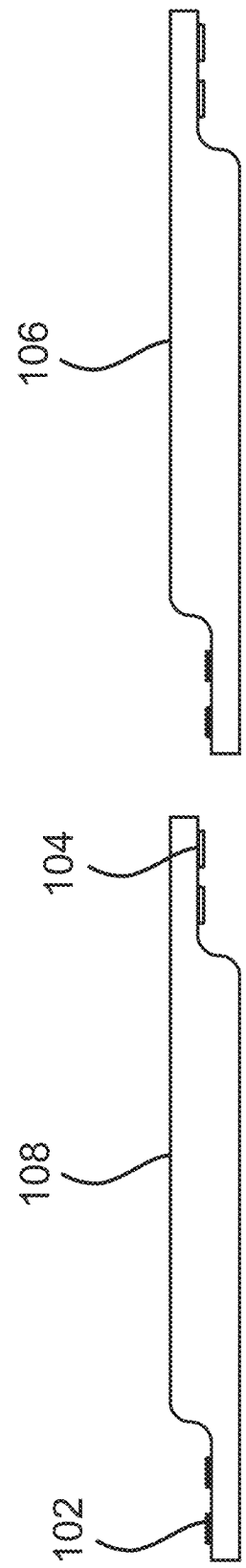
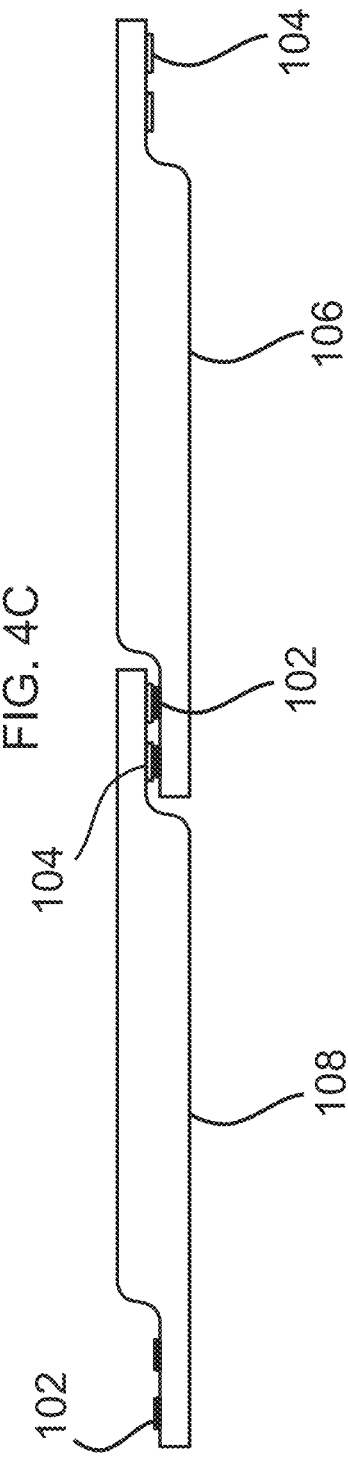
FIG. 4C
FIG. 4D

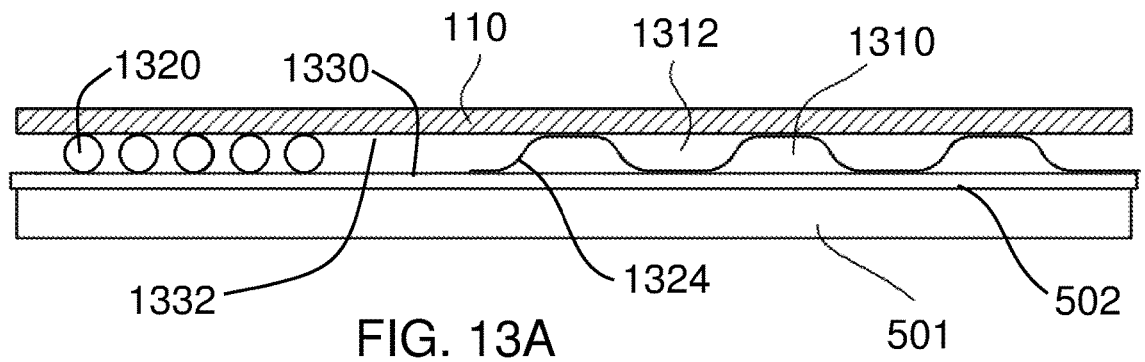
FIG. 13A
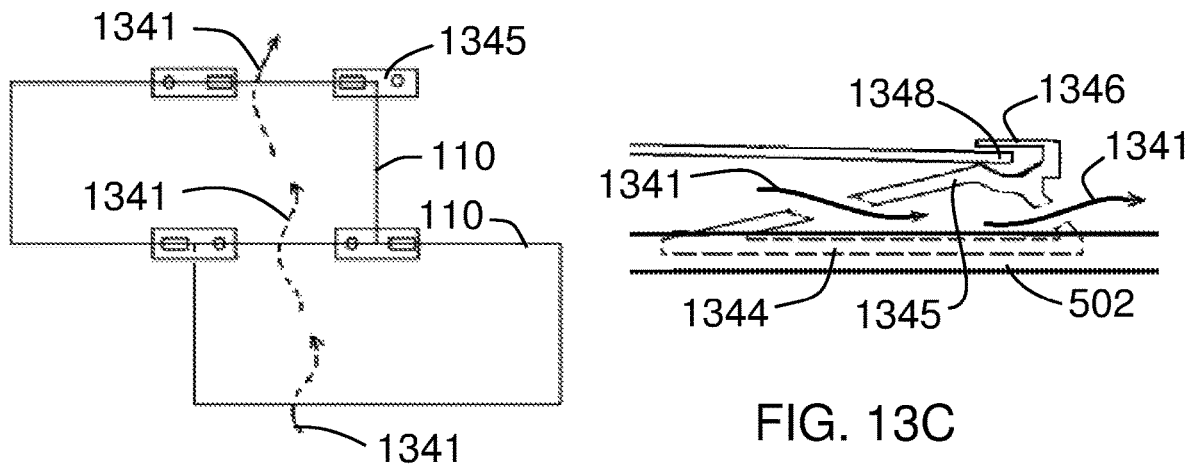
FIG. 13B
FIG. 13C
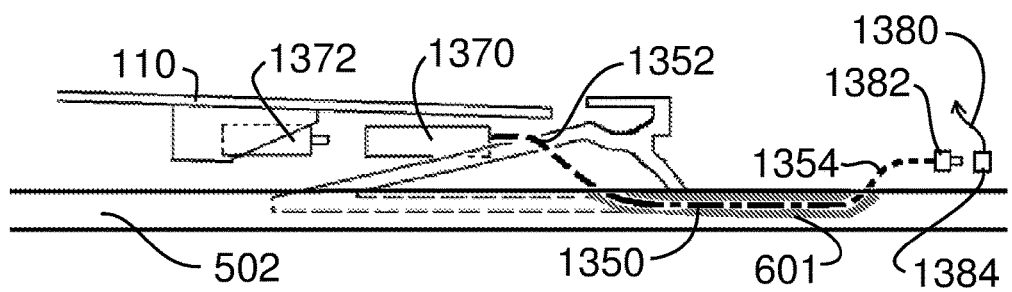
FIG. 13D

ROOFING UNDERLAYMENT FOR SOLAR SHINGLES

CROSS-REFERENCE TO RELATED APPLICATIONS

This application is a continuation in part of U.S. patent application Ser. No. 15/391,347 filed Dec. 27, 2016 and entitled "Interlocking Roofing System." This application is also a continuation-in-part of U.S. patent application Ser. No. 16/181,268, filed Nov. 5, 2018 and entitled "Photovoltaic Modular System," which application was, in turn, a continuation of U.S. patent application Ser. No. 15/261,160, filed Sep. 9, 2016, entitled "Photovoltaic Modular System," and now issued as U.S. Pat. No. 10,205,421. The entire disclosures of these prior applications are hereby incorporated herein by reference.

TECHNICAL FIELD

This invention relates to modular photovoltaic solar shingle systems.

BACKGROUND

Solar shingles have been available for more than a decade. The installation of most of the solar shingle systems on the market today are very labor intensive. With most systems, it is necessary to first prepare the roof for the installation of the shingles. This may include placing a protective layer or water-resistant material on the roof surface. Structural features may also be installed on the roof in order to mechanically connect the shingles to the roof. These structural features may include some kind of rack or channel that the shingles attach to. These racks or channels must be physically attached to the roof structure. Typically, this requires a penetration through the water-resistant material and roof sheathing with screws or some other attachment mechanism. Every penetration may create a potential for future leaks in the roof.

For traditional solar shingle systems, once the structure is in place to support the shingles, the electrical wiring must be provided to each of the shingles. Typically, each shingle is "daisy-chained" together with adjacent shingles in the same row, connecting a row of shingles in series. At the end of each row there is normally a junction box that combines multiple rows of shingles and runs the combined power of these multiple rows of shingles to an electrical distribution system via an electrical power panel in the house or building.

The connection of shingles to adjacent shingles is normally done by connecting a shingle with an MC4 connector that provides a watertight electrical connection between two adjacent shingles. The row wiring at the end of each row of shingles typically has a junction box that combines multiple row wiring runs together, then has a combined home run back to the service panel. These steps typically require a significant amount of labor.

Many solar roof shingle systems consist of a series of solar shingles connected together either in series or in parallel. They are normally connected by wires with male and female connectors on either side of the wiring that connects the shingles. The wiring is either run along the backside of the shingles along a mounting rack, or along the inside of the back frame of the shingle itself. In some cases, the wiring is run inside a wiring chase or raceway behind the shingles.

In some cases, the shingles are applied directly to the roof surface. In other cases, a support structure is attached to the roof that provides a raceway for interconnecting wiring between the shingles. In every case it is necessary to electrically connect each solar shingle to an electrical circuit that distributes the electricity produced by the solar shingles to an electrical circuit.

Alternatively, the connecting wiring for multiple shingles may be integrated within the shingle itself, as described in patent application Ser. No. 15/261,160 submitted 9 Sep. 2016, entitled "Photovoltaic Modular System". When the wiring is integrated or embedded within each of the shingles in the system, there still is the need to connect the wiring from the shingles to the electrical panel or devices being served by the shingles. It is also necessary to structurally attach the shingles to the roof.

Solar power systems are typically mounted in a location facing the sun in order to maximize the exposure to solar energy. However, there can be obstructions to the direct sunlight needed to power the solar panels. Clouds, trees, and architectural features or building elements can cause shading. Even partial shading of the solar panel can dramatically reduce the power output since the electron flow inside the panel is in series. Shading of only one section or portion of the solar panel will block the flow for the entire panel or group of panels.

Traditional solar power systems normally include multiple solar panels that are connected to each other by either parallel or series wiring (or a combination of both).

Prior to the introduction of microinverters, most if not all solar power systems were wired in series, having several "strings" of panels (a group of many panels, circuited in series), with each string feeding into a large power inverter that converted the DC power to AC power. The main disadvantage of this design is the fact that if there is shading on even one single panel within the string, it affects the current flow of that entire string (because they are wired in series) and reduces the total string power output to the lowest electrical current flow restriction created by the shading of that one panel.

For many solar shingles, a junction box or other similar equipment, connectors or parts are required for the connection to the power circuits that extend back to an electrical service panel. The connection to the interconnecting wiring with wire nuts or connectors and installing junction boxes requires a lot of time and labor.

In addition to the electrical connections, there is also needed a system to attach the shingles to a structure such as a roof structure. In some systems, the shingles are attached to the roof with adhesive or otherwise physically attached by nails or screws.

It is known that many solar shingles that are attached directly to the roof surface are not as efficient because of heat buildup. Many of the traditional systems do not provide a pathway for air to be transmitted behind the shingles and out of the top ridgeline of the roof to allow for naturally cooling of the shingles.

SUMMARY

In one aspect, the invention is a roofing underlayment for solar shingles that includes a water-impervious membrane adapted to be attached to a roof. The underlayment also includes a mechanical attachment member having a mechanical first portion embedded within the membrane and having a mechanical second portion extending above the membrane, wherein the mechanical second portion of the mechanical attachment member is configured to mechanically attach a solar shingle to the roof. The underlayment also includes an electrical conductor having an electrical first portion of which is embedded within the membrane, having an electrical second portion which is configured to electrically connect to a solar shingle, and having an electrical third portion which is configured to electrically connect to an electrical circuit. An air gap area is also provided that allows for air flow below the solar shingles. The air gap area comprises an area between a bottom surface of the solar shingles and a top surface of the membrane.

In a preferred embodiment, the photovoltaic modular solar shingle system is mounted to a roof. Solar shingles may be configured to create an air gap area between the solar shingles and the roof, allowing air flow to naturally cool the backside of the shingles which improves energy production. The invention further comprises a roof mounted power distribution system which provides electrical and mechanical connection of the solar shingles to a roof. The power distribution system may be embedded in a roof underlayment which may be adhesively attached to the roof. Solar shingles are connected to the power distribution system by an integral clasping mechanism that makes both mechanical and electrical connections. No external wiring, connectors or devices are required to make the electrical connection between the shingles and the power distribution system. Contacts are integral and embedded into each individual shingle.

This invention has been developed in response to the present state of the art and, in particular, in response to the problems and needs in the art that have not yet been fully solved by currently available systems and methods. Features and advantages of different embodiments of the invention will become more fully apparent from the following description and appended claims or may be learned by practice of the invention as set forth hereinafter.

Consistent with the foregoing, a photovoltaic modular solar shingle system is disclosed. The objectives of the system are to provide a photovoltaic modular solar shingle system mounted to a roof. Solar shingles may be configured to create an air gap area between the solar shingles and the roof, allowing air flow to naturally cool the backside of the shingles which improves energy production. The invention further comprises a roof mounted power distribution system which provides electrical and mechanical connection of the solar shingles to a roof. The power distribution system may be embedded in a roof underlayment which may be adhesively attached to the roof. Solar shingles are connected to the power distribution system by an integral clasping mechanism that makes both mechanical and electrical connections. No external wiring, connectors or devices are required to make the electrical connection between the shingles and the power distribution system. Contacts are integral and embedded into each individual shingle. Additional objectives include simplifying the installation of solar shingles allowing the shingles to be installed and connected together in the same step.

In a preferred embodiment, a photovoltaic modular solar shingle system may include two or more photovoltaic (PV) modules producing a current, each PV module consisting of one or more photovoltaic cells. Each of the two or more PV modules may also include a plurality of contacts wherein the contacts couple the two or more PV modules together. The two or more PV modules may further include embedded parallel wiring connecting the contacts to the cells. The PV modules may also include an encapsulation material enclosing the one or more photovoltaic cells, the plurality of contacts, and the embedded parallel wiring. The contacts from a first PV module of the two or more PV modules may be connected to the contacts of a second PV module of the two or more PV modules; and the embedded parallel wiring of each of the two or more PV modules may be rated to handle the combined electrical current of all of the interconnected two or more PV modules. The embedded parallel wiring may further connect the two or more PV modules to at least one additional PV module through the plurality of contacts of each PV module and provide the interconnecting wiring for all connected three or more PV modules.

In a preferred embodiment, the PV modules may be solar shingles. Each solar shingle may be mounted on a roof surface. Each solar shingle may be plugged into a roof mounted power distribution system, mechanically and electrically connecting the solar shingle to the power distribution system. In an embodiment, at least one of each solar shingles may also include electrical wiring and connectors extending power from the PV modular system to the power distribution system. The power distribution system may be embedded in an underlayment between the PV modular system and a roof surface. The power distribution system may also extend the power from the PV modular system to at least one of an electrical panel and an electrical device.

In an embodiment, the solar shingles may be configured to hold a bottom surface of each solar shingle above a top surface of a roof, thereby creating an air gap between the shingles and the roof surface. The solar shingles configuration may include a corrugated shape wherein portions of a solar shingle of the solar shingles are in contact with the roof surface and other portions of the solar shingle are above the roof surface, thereby creating an air gap between the shingles and the roof surface.

In another embodiment, the contacts from a first PV module may be mechanically connected to a second PV module. The contacts from the first PV module may also be electrically connected to the second PV module. In an embodiment, the contacts from a first PV module may be connected to a second PV module with a conductive adhesive.

In one embodiment, the one or more PV modules may be connecting and providing power to one or more electrical components. The one or more electrical components may include a system for charging energy storage devices or components.

In certain embodiments, each PV module may have a full power rating of parallel wiring equal to or greater than a sum of maximum power production of a combined interconnected PV module assembly. Electronic controls of the voltage and current of each PV module may be incorporated into each PV module's internal circuiting. In an embodiment, an inverter may be incorporated into at least one of each PV module's internal circuiting. The embedded parallel wiring within the one or more PV modules may provide an electrical pathway for both power and control functions.

In an embodiment, the system may also include peel and stick adhesive backing to allow the PV modules to be adhered to a surface. The system may further include a controller comprising electronics that bypasses one or more non-current producing PV modules allowing the current to pass through to the three or more PV modules.

In another embodiment, a mechanical attachment member may run substantially the length of a membrane and have multiple portions embedded within the membrane and multiple portions extending above the membrane for attaching multiple solar shingles. The multiple portions extending above the membrane may be mechanically configured for receiving attachment members on multiple solar shingles. The attachment members on the multiple solar shingles may also include electrical connection features.

In an embodiment, the electrical conductor may have multiple electrical portions configured to electrically connect multiple solar shingles.

In one embodiment, the membrane may also include a second mechanical attachment member that runs substantially the length of the membrane and parallel to the mechanical attachment member and at least a second electrical conductor that runs parallel to the electrical conductor.

In a certain embodiment, the mechanical second portion of the mechanical attachment member and the electrical second portion of the electrical conductor may be in proximity and configured so that mechanical attachment and electrical connection of the solar shingle happen simultaneously. In an embodiment, the electrical third portion of the electrical conductor may include an insulated cable with a plug-in electrical connector for connecting to the electrical circuit. The electrical third portion of the electrical conductor may include a second plug-in electrical connector for connecting to the electrical second portion of the electrical conductor.

In an embodiment, the membrane may be adapted to be attached to a roof by adhesive. The adhesive may be a pressure-sensitive adhesive protected by a peelable layer prior to attachment to the roof. In another embodiment, the membrane may also include a raised area for connecting the multiple electrical portions to the multiple solar shingles.

In certain embodiments, a membrane may include a water-impervious membrane adapted to be attached to a roof by adhesive, and may include a mechanical attachment member running substantially the length of the membrane and have multiple alternating embedded portions within the membrane and extending portions extending above the membrane, wherein the extending portions each are mechanically configured for attaching a solar shingle to the roof. The membrane may also include an electrical conductor running substantially the length of the membrane and having at least a first embedded portion embedded within the membrane, having multiple connecting portions extending above the membrane configured to electrically connect to each of the solar shingles, and having a third portion configured to plug in and electrically connect to an electrical circuit. In an embodiment, the connection portions and the electrical extending portions may be positioned and configured so that solar shingles are mechanically attached and electrically connected simultaneously and without creating holes through the membrane. An air gap area that allows for air flow below the solar shingles may also be included. The air gap area may be an area between a bottom surface of the solar shingles and a bottom surface of the membrane.

In one embodiment, the membrane may include at least a second mechanical attachment member of similar construction and running parallel to the mechanical attachment member and at least a second electrical conductor of similar construction and running parallel to the electrical conductor. The electrical conductor may have multiple electrical portions configured to electrically connect multiple solar shingles. The multiple portions extending above the membrane may be mechanically configured for receiving attachment members on multiple solar shingles. The attachment members on the multiple solar shingles may also include electrical connection features.

In certain embodiments, the mechanical attachment member and the multiple electrical portions of the electrical conductor may be in proximity and configured so that mechanical attachment and electrical connection of the solar shingle happen simultaneously. The membrane may be adapted to be attached to a roof by adhesive. The membrane may further include a raised area for connecting the multiple electrical extending portions to the multiple solar shingles.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 1B is a top view of three vertical PV modules that are connected together.

FIG. 1C is a top view of three horizontal PV modules that are connected together.

FIG. 1E is an isometric view of a solar shingle showing air-flow below the shingle.

FIG. 1F is an side view of a solar shingle showing an air-gap area below the shingle.

FIG. 2A is an isometric view of a two adjacent shingles not connected together, according to one embodiment.

FIG. 2B is an isometric view of a two adjacent shingles 110 connected together, according to one embodiment.

FIG. 4A is a top view of two PV modules prior to being connected.

FIG. 4B is a top view of two PV modules that are connected.

FIG. 4C is a side view of two PV modules prior to being connected.

FIG. 4D is a side view of two PV modules that are connected together.

FIG. 13A is a side view of a cross section of a roofing system showing air gap area.

FIG. 13B is an overhead view of two solar shingles with air flow behind the backside of the shingles.

FIG. 13C is a side view of a mechanical attachment member.

FIG. 13D is a side view of a mechanical attachment member with electrical connections.

DETAILED DESCRIPTION

Figure 1A:
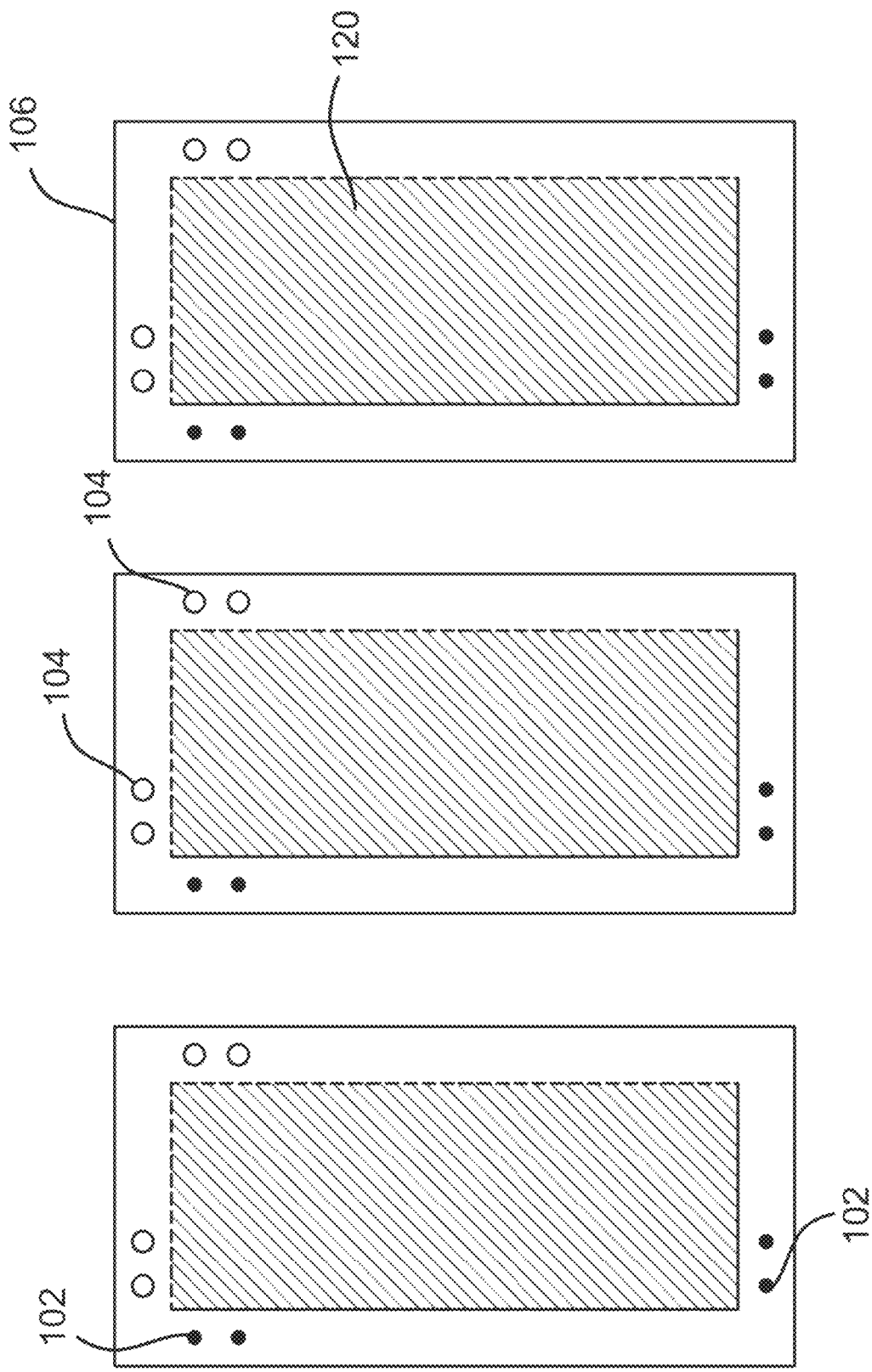
FIG. 1A is a top view of three PV modules before they are connected together.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

DEFINITIONS

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

"Solar shingles" and "shingles" as referred to throughout this document may refer to an electrical module that produces energy, collects energy, produces power, transmits power, conducts electricity, communicates energy, converts energy from one form to another, and combinations of one or more of the foregoing. "Solar Shingles" in a preferred embodiment, also refer to Photovoltaic (PV) electrical modules that collect solar energy from the sun and convert it to electrical energy. In a preferred embodiment, the solar shingles also provide protection from the environment (wind, rain and other wind-blown materials or other elements), in that they act as actual roof shingles.

In summary, the key advantages posited for the present system include a system that:

incorporates the parallel wiring into each individual module, allows the modules to be directly connected together without the need for additional interconnecting wiring, has embedded wiring which allows the modules to be arranged in any configuration, with pairs of module connectors on all four sides of the module, incorporates the control electronics inside each module, can be directly attached to a smooth surface area without any other separate support structure.

provides an electrically insulated and environmentally protected pathway from the solar shingles to the electrical devices being served or to an electrical service panel;

provides a protected connection between the shingles and the electrical conductors and wiring connecting the shingles to electrical loads or panel;

provides a mechanical connection of the shingles to the membrane;

provides a structural attachment of the membrane to the roof structure;

allows multiple shingles or rows of interconnected shingles to be connected to this electrical interconnection system;

Provides an air gap area between the shingles and the membrane for air flow;

simplifies installation by providing a peel and stick adhesive system that allows the attachment of the membrane to a roof or other building structure; and further simplifies the installation by making the electrical connection of the shingles to the electrical interconnection system by a simple plug-in connection.

Referring to the drawings, FIG. 1A is an illustration of one example of the PV modular system comprising three PV modules. The drawing 100 shows a top view of three PV modules before they are connected together. The module connectors 102 on the top of the PV module are designed to connect to the module connectors 104 on the bottom of an adjacent PV module. Each PV module 106 is fully functional without any other modules connected to it.

FIG. 1B illustrates how three vertical PV modules are connected. PV module 106 is connected to two additional PV modules. The secondary PV module 108 overlaps the PV module 106 and the electrical connection at the interface is made by the contact of top module connector 102 of PV module 106 with bottom module connector 104 of PV module 108. The third PV module 110 is connected in the same manner. These connections make the embedded parallel wiring continuous across all three connected PV modules, allowing the current to flow from all productive PV modules to provide power the connected electrical components.

FIG. 1C illustrates how three horizontal PV modules are connected. A PV module 106 is connected to two additional PV modules. The secondary PV module 108 overlaps the PV module 106 and the electrical connection at the interface is made by the contact of top module connector 102 of PV module 106 with bottom module connector 104 of PV module 108. The third PV module 110 is connected in the same manner. These connections make the embedded parallel wiring continuous across all three connected PV modules, allowing the current to flow from all productive PV modules to provide power the connected electrical components.

Figure 1D:
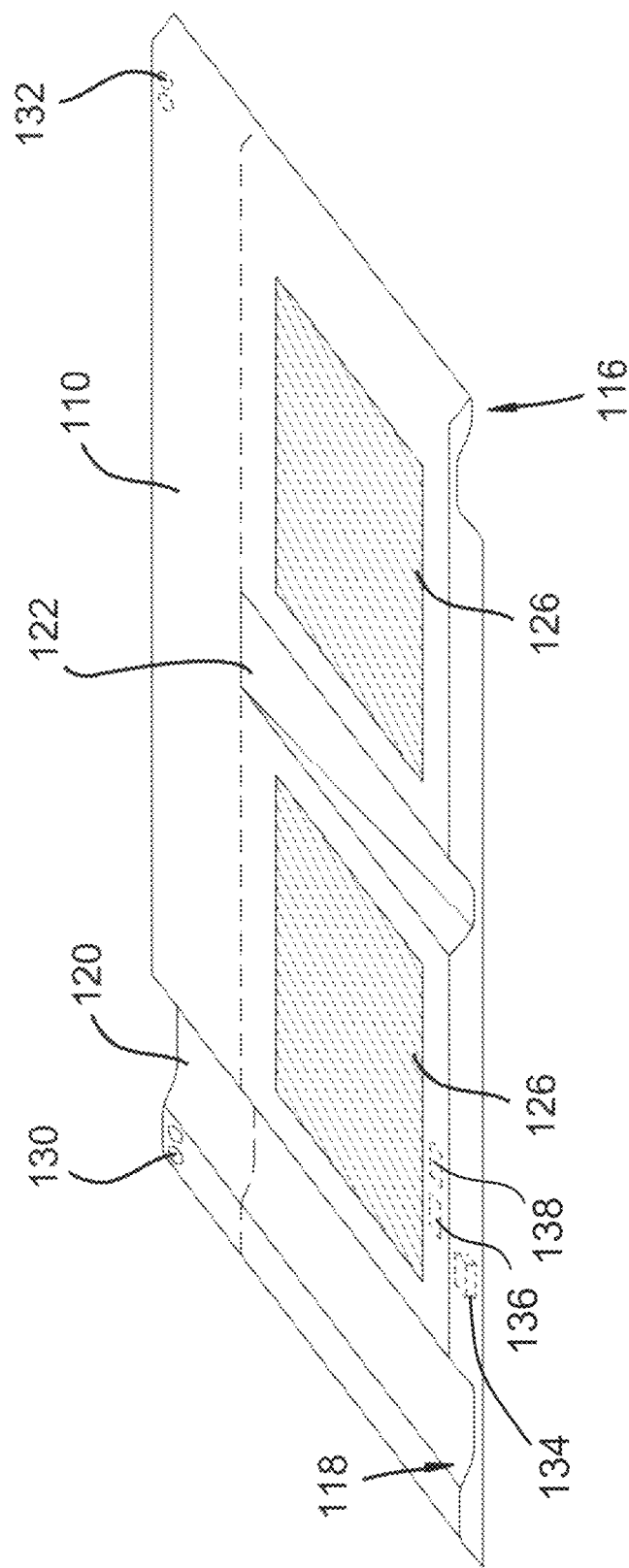
FIG. 1D is an isometric view of a solar shingle, according to one example embodiment.

FIG. 1D is an isometric view of a solar shingle, according to one example embodiment. Electrical contacts 130 connect solar shingle 110 to an adjacent solar shingle. Contacts 132 connect the solar shingle to an adjacent solar shingle or to an electrical circuit embedded in a membrane. Channel 120 provides a connection trough for the adhesive attachment of adjacent solar shingle, and provides a channel for water to be drawn down and away from the electrical contact area. Protruding edge 116 interlocks with receiving edge of an adjacent solar shingle. In a similar fashion, receiving edge 118 interlocks with a protruding edge of an adjacent solar shingle. Photovoltaic module surface area 126 is also shown. Channel 122 is shown running from a location at least 1" from a top edge of the solar shingle and extending to a bottom edge of the solar shingle. The base of the channel 122 ramps down to the bottom edge of the solar shingle to allow water to be drawn down and away from the face of the shingle. This channel is superior to the standard configuration of 3 tab shingles because there is a base material providing a continuous structure between the tabs.

In another embodiment, Channel 120 provides a connection trough for the adhesive attachment of adjacent shingle, and provides a channel for water to be drawn down and away from the attachment area. Protruding edge 116 interlocks with receiving edge of an adjacent shingle. In a similar fashion, receiving edge 118 interlocks with a protruding edge of an adjacent shingle. Shingle surface area 126 is also shown. Channel 122 is shown running from a location at least 1" from a top edge of the shingle and extending to a bottom edge of the shingle. The base of the channel 122 ramps down to the bottom edge of the solar shingle to allow water to be drawn down and away from the face of the shingle. This channel is superior to the standard configuration of 3 tab shingles because there is a base material providing a continuous structure between the tabs.

In certain embodiments, inverter 134, control electronics 136, and power management device 138 may be integrated within each solar shingle as shown. The power management device 138 may comprise a charging system for energy storage devices and may also comprise power distribution management devices such as relays and transistors. Control electronics 136 may comprise processors, non-volatile memory, software, hardware and firmware that connect to sensors or other control input devices and components to manage and control the power flow and track system performance. The control electronics may further comprise a database in the memory that records and analyzes all data from the system to determine optimal settings for performance of the system. A model may be built and stored in memory based on the historic data to predict future performance.

FIG. 1E is an isometric view of a solar shingle showing air-flow below the shingle. Cool air 140 enters below the bottom edge of the shingle 110 and is drawn up to the upper edge by the natural convection of the heat produced by the solar shingle 110, and heated air 142 exits below the upper edge of shingle 110. Photovoltaic module surface area 126 along with channel 122.

FIG. 1F is a side view of a solar shingle showing an air-gap area below the shingle. Air-gap area 150 is shown below the shingle. The lower points at the bottom of channel 122 that come in contact with a roof surface may be adhesively attached to the roof by adhesive 160.

FIG. 2A is an isometric view of a two adjacent shingles not connected together. Two adjacent shingles 110 are shown before connection. Protruding edge 116 is shaped to conform to adjacent receiving edge 118. In another embodiment, shingles 110 are solar shingles with contacts 130 and 132 for connection to adjacent solar shingles.

FIG. 2B is an isometric view of a two adjacent shingles 110 connected together. Overlap area 205 is shown where the two adjacent shingles 110 are adhesively connected together, creating channel 210. In another embodiment, shingles 110 are solar shingles with contacts 130 and 132 for connection to adjacent solar shingles.

Figure 2C:
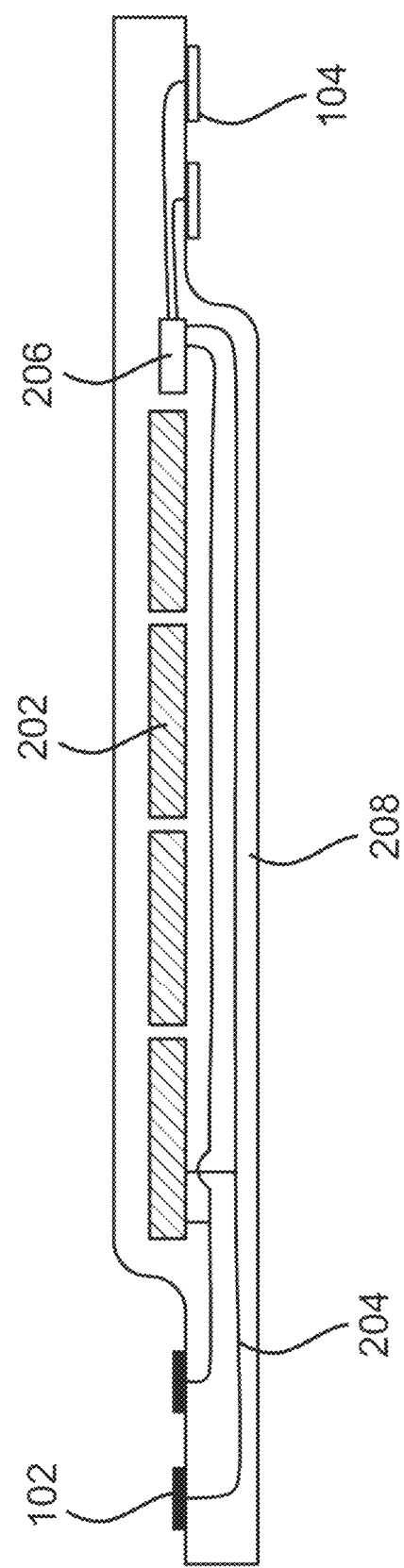
FIG. 2C is a cross section of a PV module showing the internal components.

FIG. 2C is a cross section of a PV module showing the internal components. Photovoltaic cells 202 are arranged at the top of the PV module facing up and interconnected electrically. Module connectors 102 are mounted on the top of the PV module. Module connectors 104 are mounted on the bottom of the PV module. Embedded parallel wiring 204 connects to modular connectors 102 and module connectors 104, to photovoltaic cells 202 and to control electronics 206. The encapsulation material 208 completely encapsulates all of the components, integrating them into one complete encapsulated assembly.

Figure 3A:
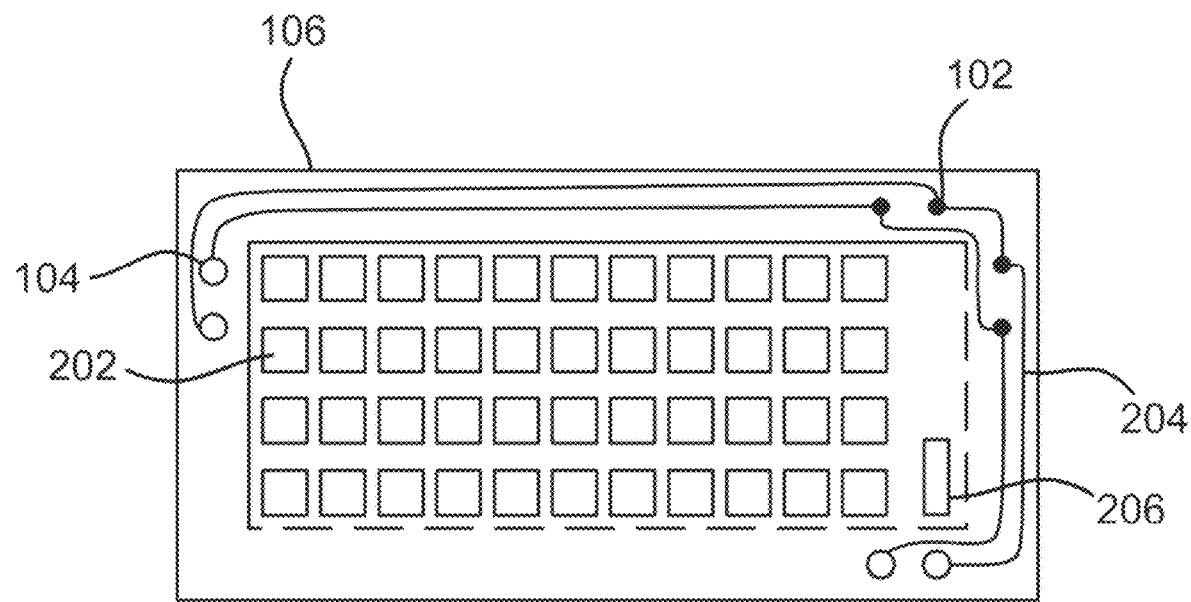
FIG. 3A is a top view of a PV module showing the internal components.

FIG. 3A is a top view of a PV module showing the internal components. Photovoltaic cells 202 are arranged at the top of the PV module facing up and interconnected electrically. Module connectors 102 are mounted on the top of the PV module. Module connectors 104 are mounted on the bottom of the PV module. Embedded parallel wiring 204 connects to modular connectors 102 and module connectors 104 and to the interconnected photovoltaic cells 202 and to control electronics 206.

Figure 3B:
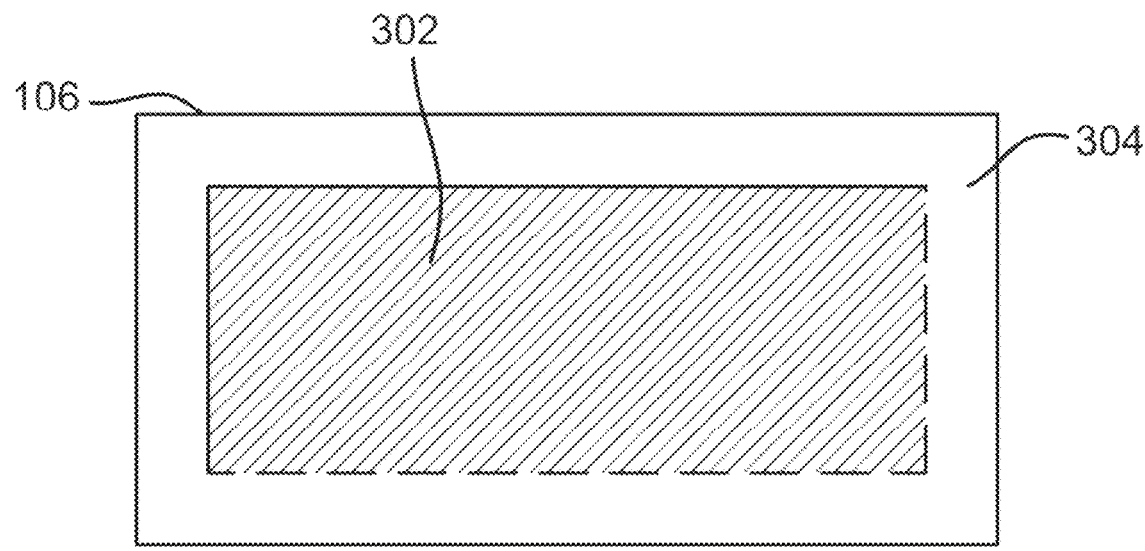
FIG. 3B is a top view of a PV module showing the overlap area for interfacing with an adjacent PV module.

FIG. 3B is a top view of a PV module 106 showing the overlap area for interfacing with an adjacent PV module. The active solar area 302 of the PV module consists of the photovoltaic cells. The outer perimeter 304 of the PV module can be overlapped by adjacent PV modules without covering the active solar area 302.

Figure 3C:
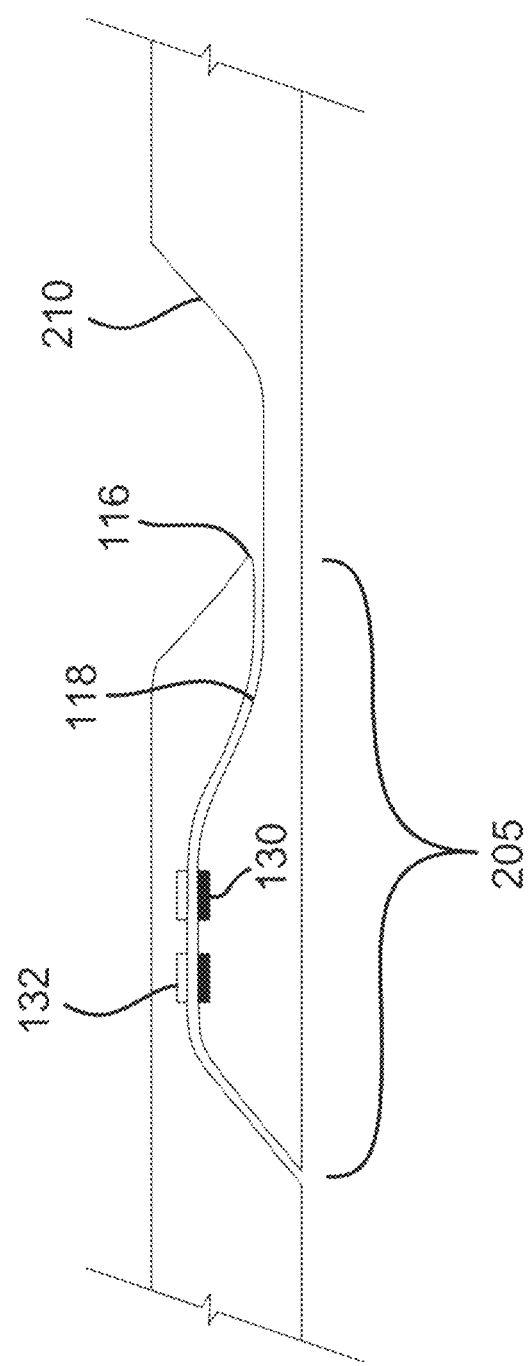
FIG. 3C is a cross section view showing the connection of two adjacent shingles, according to one embodiment.

FIG. 3C is a cross section view showing the connection of two adjacent shingles. Overlap area 205 is shown where the two adjacent shingles are adhesively connected together. Protruding edge 116 is shaped to conform to adjacent receiving edge 118. Contacts 132 electrically connect to contacts 130 providing a pathway for current to flow from one solar shingle to another. Channel 210 allows for water to be drawn down and away from the contact area. The convex shape of the channel interface with contacts 130 embedded therein is at a higher elevation than the base of channel 210, preventing water from penetrating up into the contact area. Additionally, the adhesive between the two solar shingle surfaces within overlap area 205 further protects from water intrusion.

FIG. 4A is a top view of two PV modules prior to being connected. PV module 106 is designed to fit with adjacent PV module 108 and is shown with positive 402 and negative 404 modular connectors. The embedded parallel wiring 204 connects to the interconnected photovoltaic cells 202 and extends the circuiting from PV module 106 to PV module 108 via the control electronics 206.

FIG. 4B is a top view of PV modules that are connected. PV module 106 is overlapping adjacent PV module 108 and is showing the positive 402 and negative 404 modular connectors connected together. The embedded parallel wiring 204 connects to the interconnected photovoltaic cells 202 and extends the circuiting from PV module 106 to PV module 108 via the control electronics 206.

FIG. 4C is a side view of two PV modules prior to being connected. PV module 106 is designed to fit with adjacent PV module 108 and is shown with top modular connectors 102 and bottom modular connectors 104.

FIG. 4D is a side view of two PV modules that are connected together. PV module 106 is overlapping adjacent PV module 108 and is shown with top modular connectors 102 and bottom modular connectors 104.

Figure 4E:
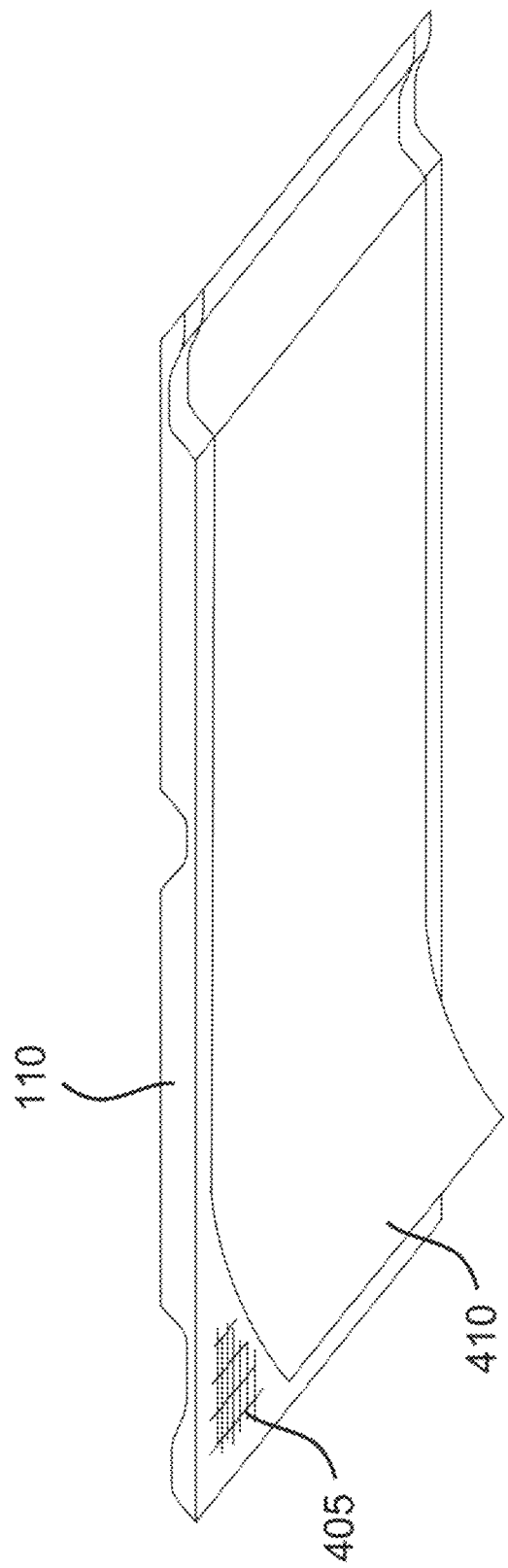
FIG. 4E is an isometric view of the roof facing bottom side of a shingle showing the adhesive and the protective backing material being removed, according to one embodiment.

FIG. 4E is an isometric view of the roof facing bottom side of a shingle 110 showing the adhesive 405, and the protective backing material 410 being removed.

Figure 5:
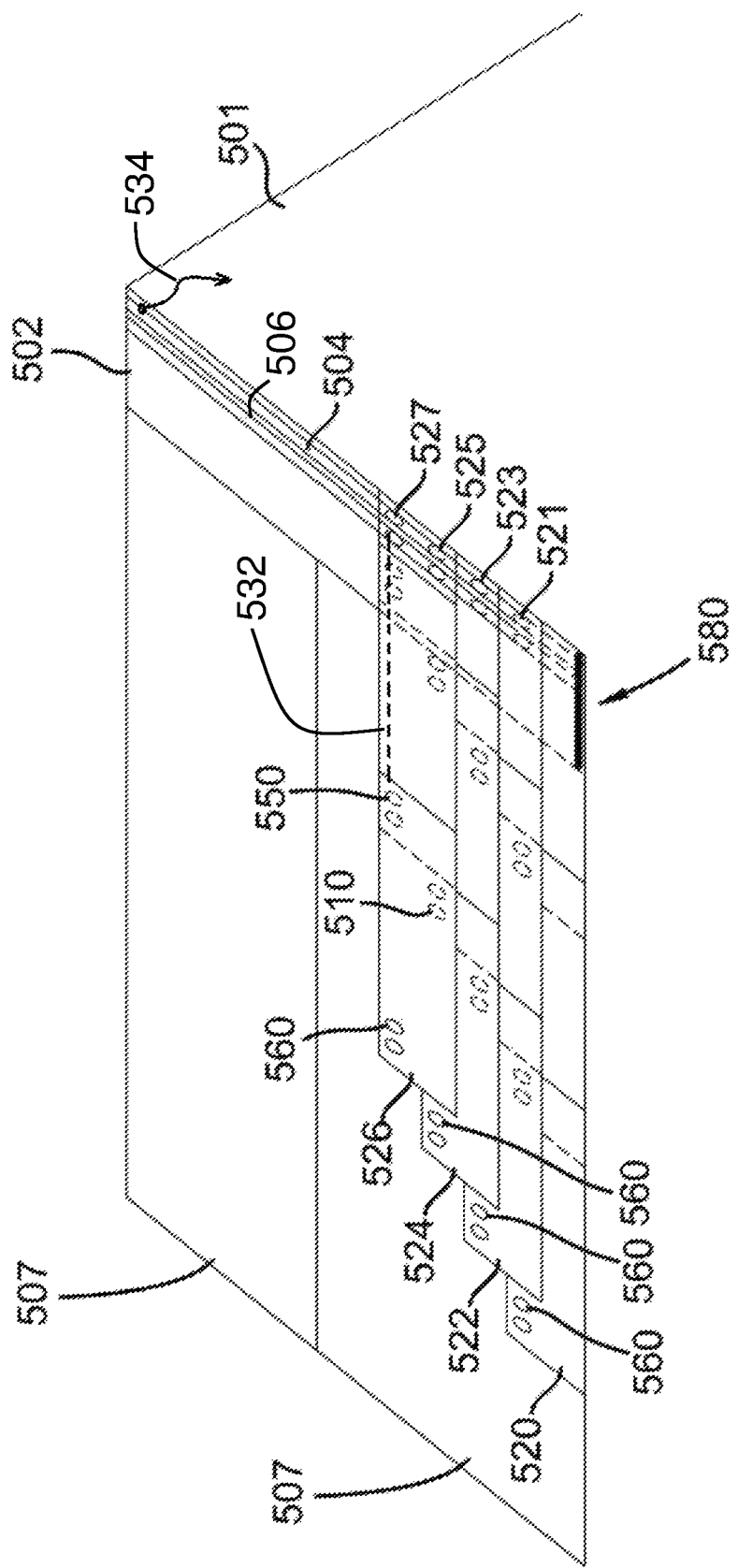
FIG. 5 is an isometric view of a roof showing the components of the electrical interconnection system, according to one embodiment.

FIG. 5 is an isometric view of a roof showing the components of the electrical interconnection system. The membrane 502 is shown on one side of a roof 501 and extends from the top of the roof down to the bottom of the roof. The membrane 502 is cut to fit the length of the roof and is sealed 580 with an electrically insulating and waterproof sealant. Rows of solar shingles 520, 522, 524 and 526 are shown installed on top of roofing underlayment 507. Electrical contacts 560 are shown that connect solar shingles to adjacent solar shingles. Electrical contacts 510 and 550 are on a bottom side of the solar shingles and are electrically and environmentally protected, both by the adhesive and also by the solar shingles overlapping the contact area. Contacts 521, 523, 525 and 527 are shown connecting shingle rows 520, 522, 524 and 526 to the membrane interface area 504.

Power distribution system 506 provides electrical and mechanical connection of the solar shingles. Interconnecting conductors 532, distribute the power of a group of solar shingles to the power distribution system 506. Power from all connected solar shingles is then extended via the power distribution system 506 to a power distribution panel or other powered devices and systems via home run 534.

Figure 6:
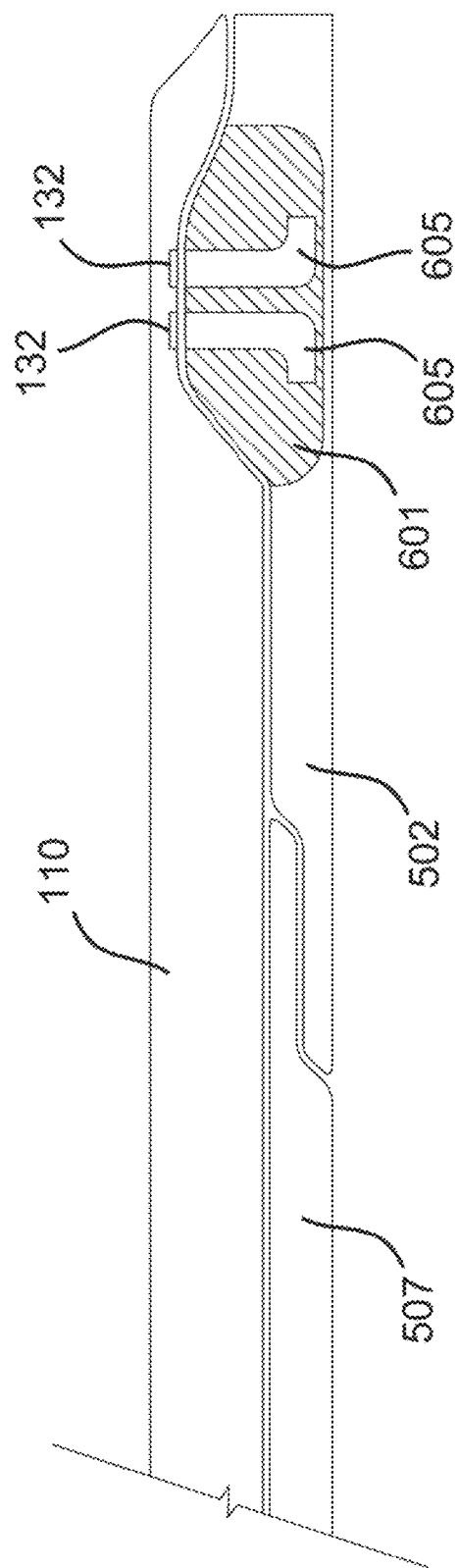
FIG. 6 is a section view of the electrical interconnection system showing the roof underlayment connecting to the membrane forming a seal, according to one embodiment.

FIG. 6 is a section view of the electrical interconnection system showing the roof underlayment 507 connecting to the membrane 502 forming a seal. Insulation 601 is shown protecting electrical conductors 605. The electrical conductors 605 connect to contacts 132 in the solar shingle 110.

Figure 7:
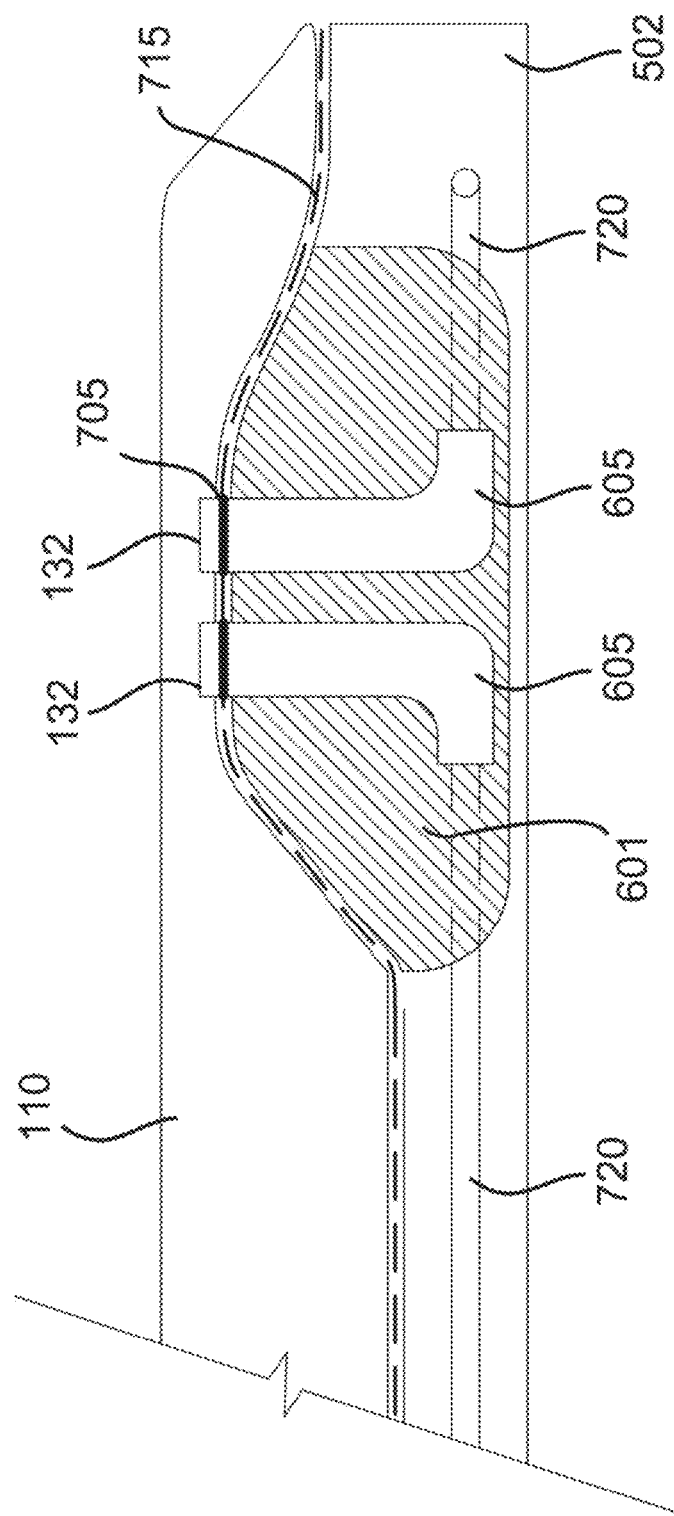
FIG. 7 is a large-scale section view of the interface between the membrane and solar shingle, according to one embodiment.

FIG. 7 is a large-scale section view of the interface between the membrane 502 and electrical module 110. Electrical wiring 720 is shown penetrating through the insulation 601, and connecting to the electrical conductors 605. Contacts 132 inside the solar shingle 110 are electrically connected by an electrically conductive material 705 to a conductive surface of the electrical conductors 605 as shown. Electrically insulating adhesive 715 connects the solar shingle 110 to the membrane 502 and holds this connection in place providing an electrical pathway from the module to the electrical interconnection system.

Figure 8A:
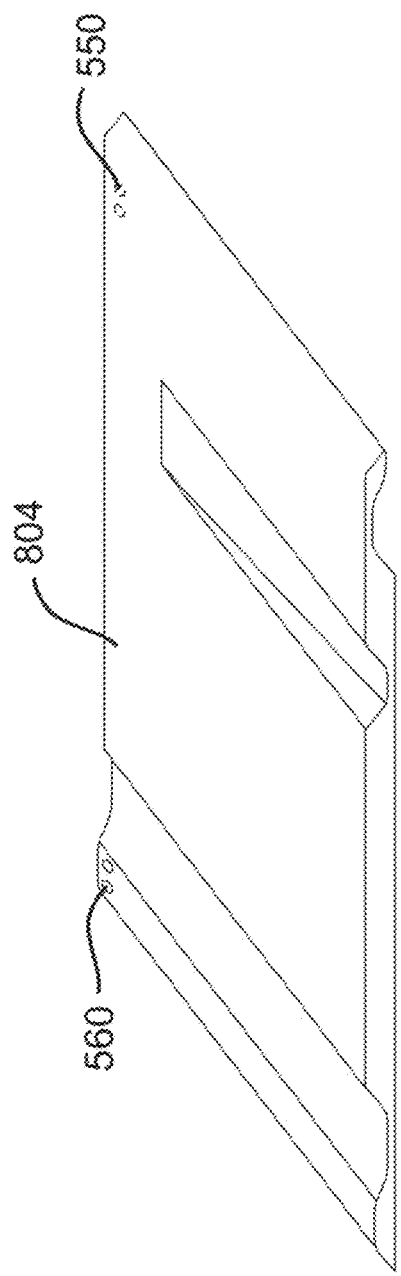
FIG. 8A is an isometric view of a short solar shingle showing the electrical contacts that interface with adjacent solar shingles, according to one embodiment.

FIG. 8A is an isometric view of a short solar shingle 804 showing the electrical contacts 560 that interface with adjacent solar shingles. The contacts 550 connect to either the membrane or to an adjacent solar shingle.

Figure 8B:
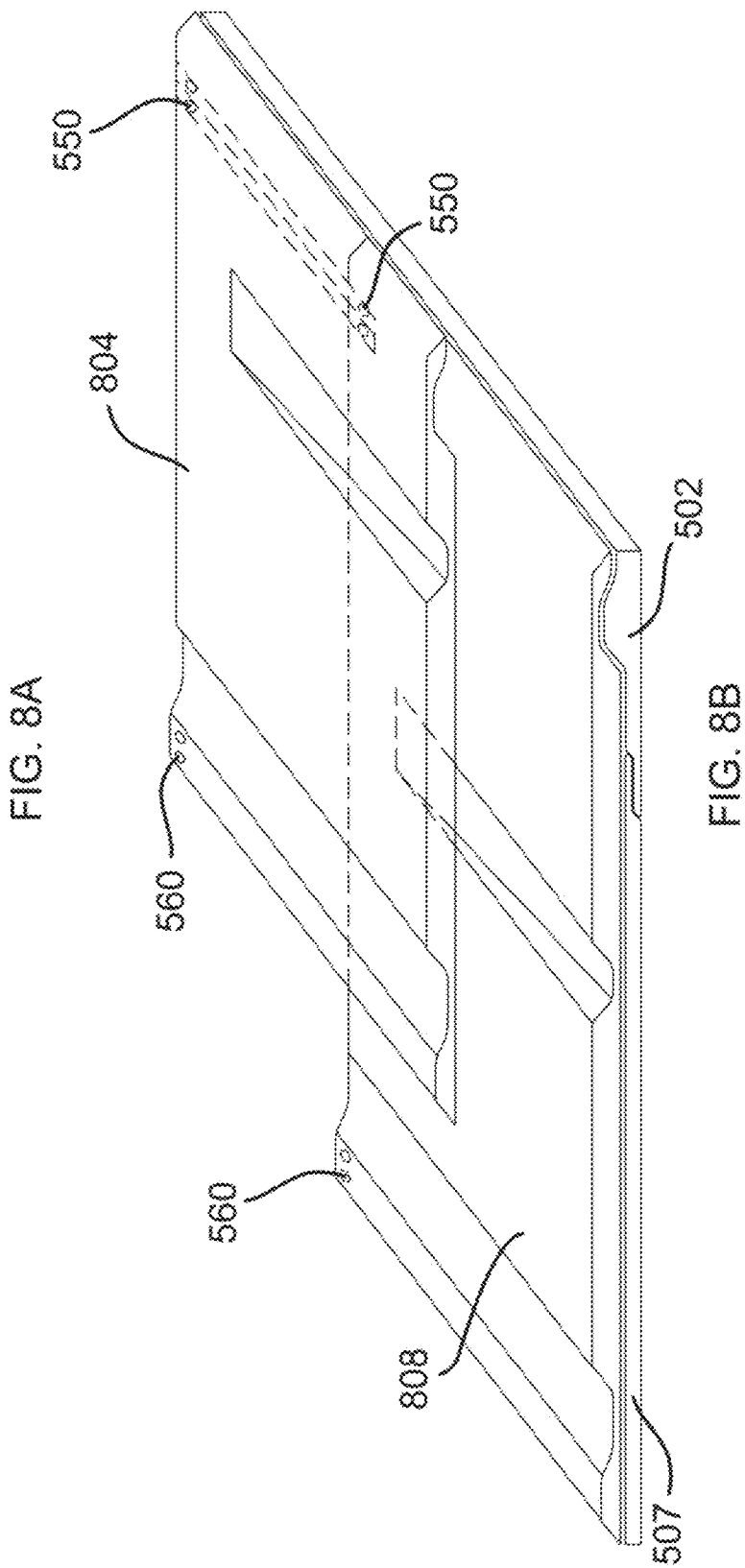
FIG. 8B is an isometric view of a short module stacked on top of and adhesively connected to a large module, according to one embodiment.

FIG. 8B is an isometric view of a short module 804 stacked on top of and adhesively connected to a large module 808. Contacts 560 are shown which provide an electrical interface for adjacent solar shingles. The solar shingles are adhesively attached to the roof underlayment 507 and membrane 502. Solar shingle electrical contacts 550 are connected to the membrane conductors as shown.

Figure 9:
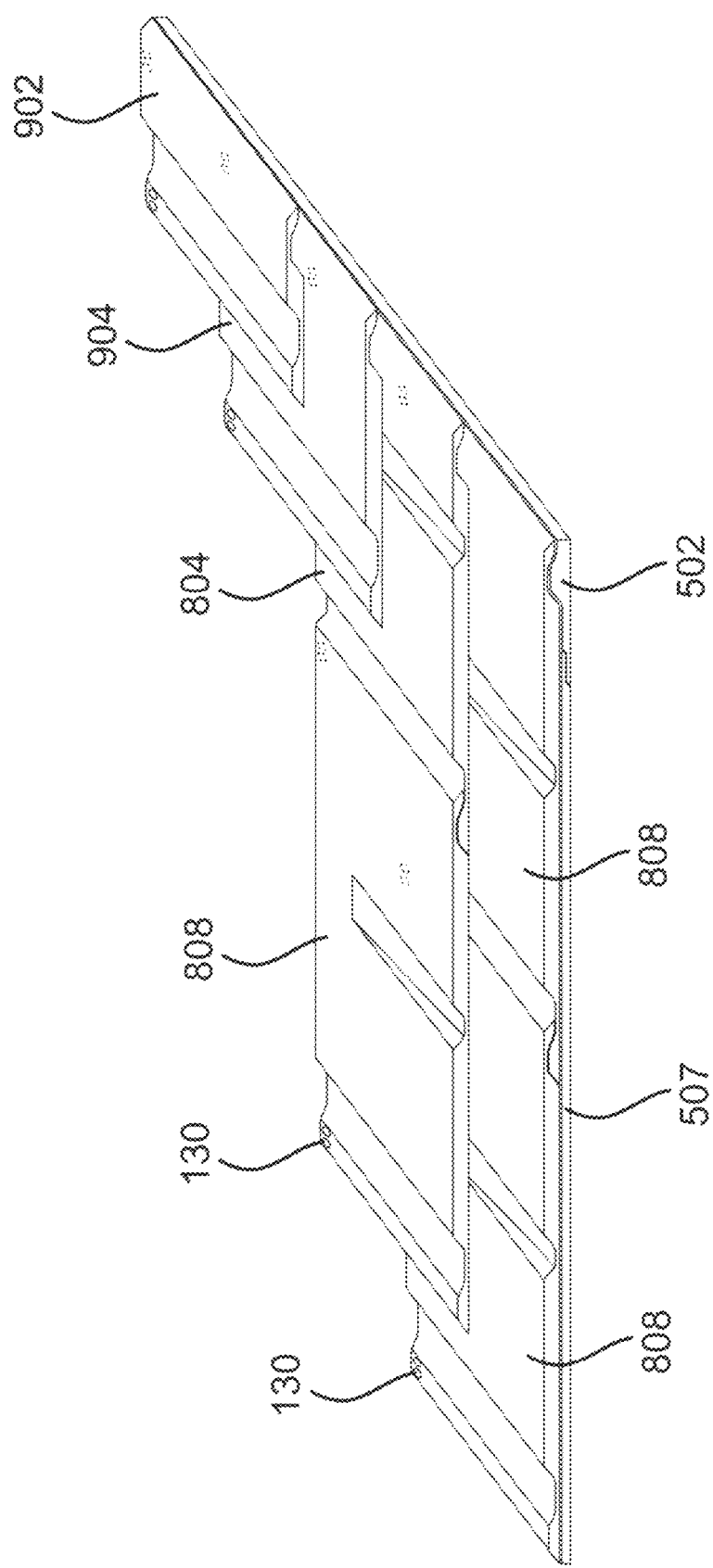
FIG. 9 is an isometric view showing a series of solar shingles of various sizes connected to the electrical interconnection system, according to one embodiment.

FIG. 9 is an isometric view showing a series of solar shingles of various sizes connected to the electrical interconnection system. Small solar shingle 902 is stacked on top of medium solar shingle 904 which is on top of a larger solar shingle 804, which is then on top of a full-sized solar shingle 808. Contacts 130 are shown which provide an electrical interface for adjacent solar shingles. The solar shingles are adhesively attached to the membrane 502 and roof underlayment 507 as shown.

Figure 10:
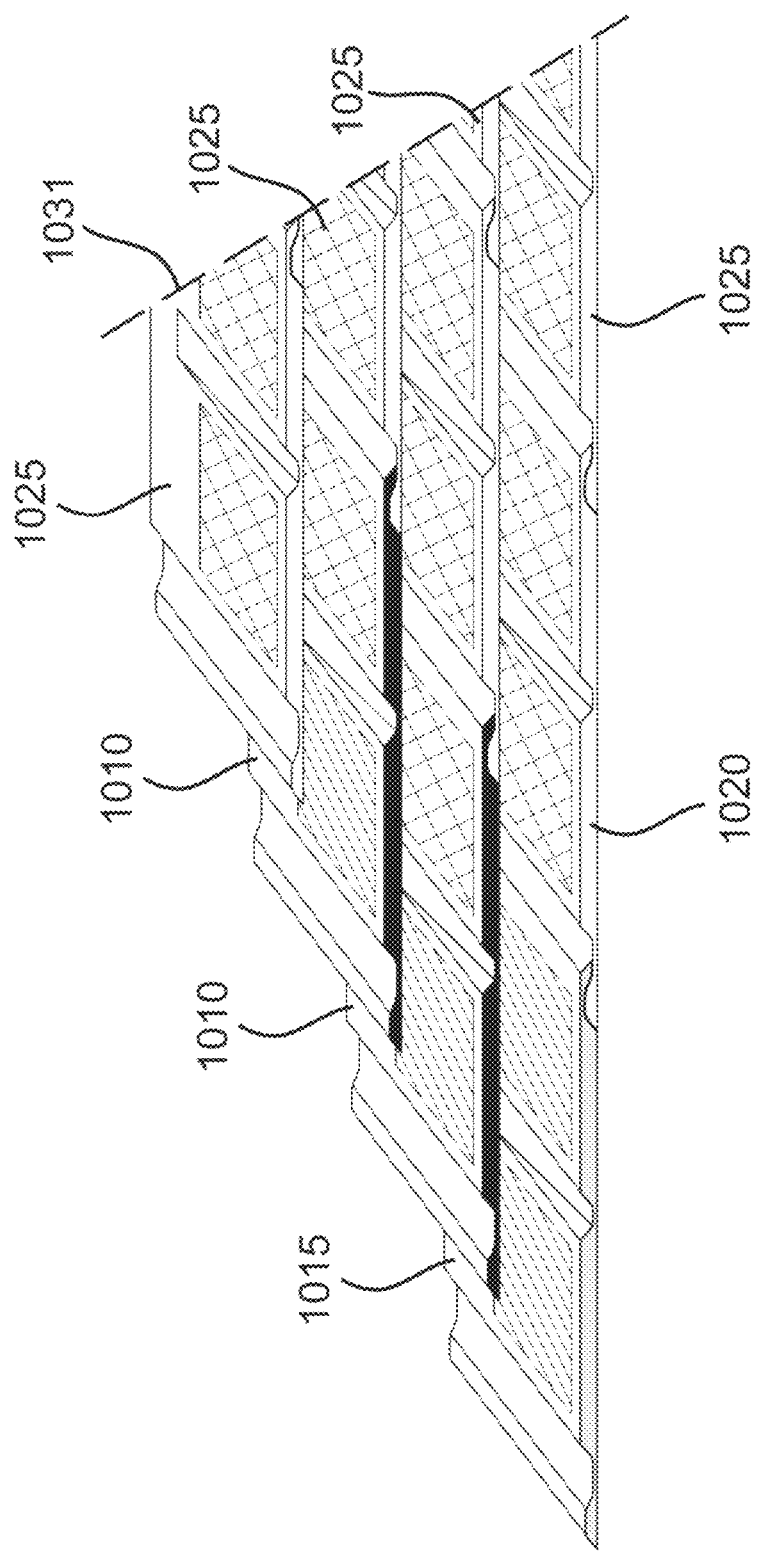
FIG. 10 is an isometric view of a series of shingles on a portion of a roof deck, according to one embodiment.

FIG. 10 is an isometric view of a series of shingles on a portion of a roof deck. Full size solar shingle 1015 is connected to congruent shingle 1020 on the base row which is then connected to partial congruent shingle 1025. Partial congruent shingle 1025 has been cut along line 1031 to accommodate roof valley or other roof obstruction. Combination shingles 1010 are also shown with a portion of the shingle being solar photovoltaic. Other congruent shingles 1025 are shown that have been cut to allow for the roof obstruction as shown.

Figure 11:
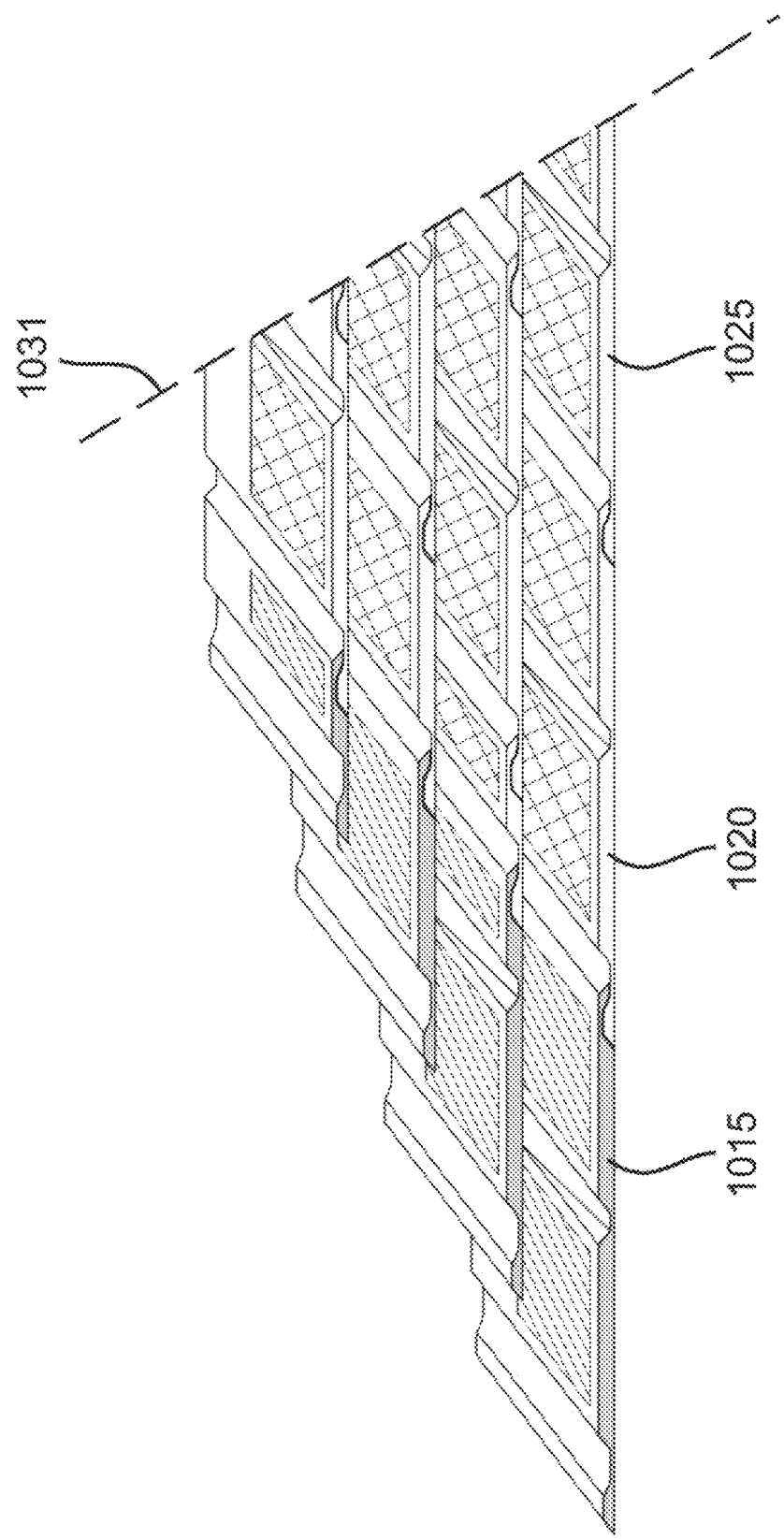
FIG. 11 is an isometric view of a series of shingles on a portion of a roof deck, according to another embodiment.

FIG. 11 is an isometric view of a series of shingles on a portion of a roof deck. Full-size solar shingle 1015 is connected to full-size congruent shingle 1020 on the base row which is then connected to partial congruent shingle 1025. Partial congruent shingles 1025 are cut along line 1031 to allow for the roof obstruction as shown.

Figure 12:
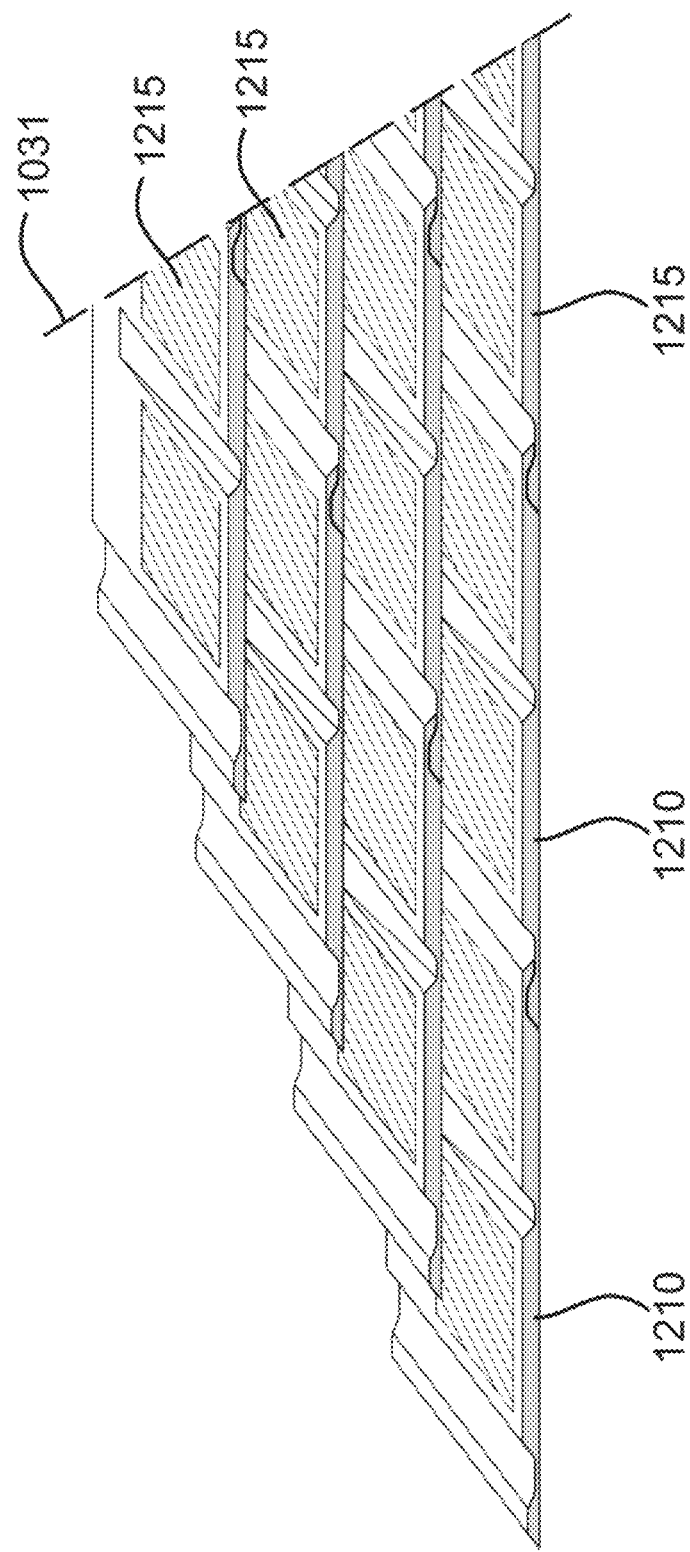
FIG. 12 is an isometric view of a series of shingles on a portion of a roof deck, according to one embodiment.

FIG. 12 is an isometric view of a series of shingles on a portion of a roof deck. Full size solar shingles 1210 are comprised of an amorphous silicon composition. Partial solar shingles 1215 along the cut line 1031 are still functional (producing a lower electrical current) after they have been cut to accommodate roof obstructions.

FIG. 13A is a side view of a cross section of a roofing system showing air gap area. Air gap areas 1310 and 1312 allow for air flow 1341 below the solar shingles. The air gap area may be an area between a bottom surface 1332 of the solar shingle 110 and a top surface 1330 of the membrane. In this embodiment, the air gap area 1310 comprises channels 1324 that run from one side of the membrane to the opposite side. The channels may comprise pipes 1320.

FIG. 13B is an overhead view of two solar shingles with air flow behind the backside of the shingles. Mechanical second portion 1345 maintains air gap area below solar shingles 110 which allows for air flow 1341 below the solar shingles 110.

FIG. 13C is a side view of a mechanical attachment member. This embodiment shows a mechanical attachment member having a mechanical first portion 1344 embedded within the membrane 502 and having a mechanical second portion 1345 extending above the membrane 502, wherein the mechanical second portion 1345 of the mechanical attachment member is configured to mechanically attach 1346 a solar shingle 1348 to the roof 501.

FIG. 13D is a side view of a mechanical attachment member with electrical connections. This embodiment shows an electrical first portion 1350 of which is embedded within the membrane 502, having an electrical second portion 1352 which is configured to electrically connect 1370, 1372 to a solar shingle 110, and having an electrical third portion 1354 which is configured to electrically connect 1382, 1384 to an electrical circuit 1380.

Figure 14:
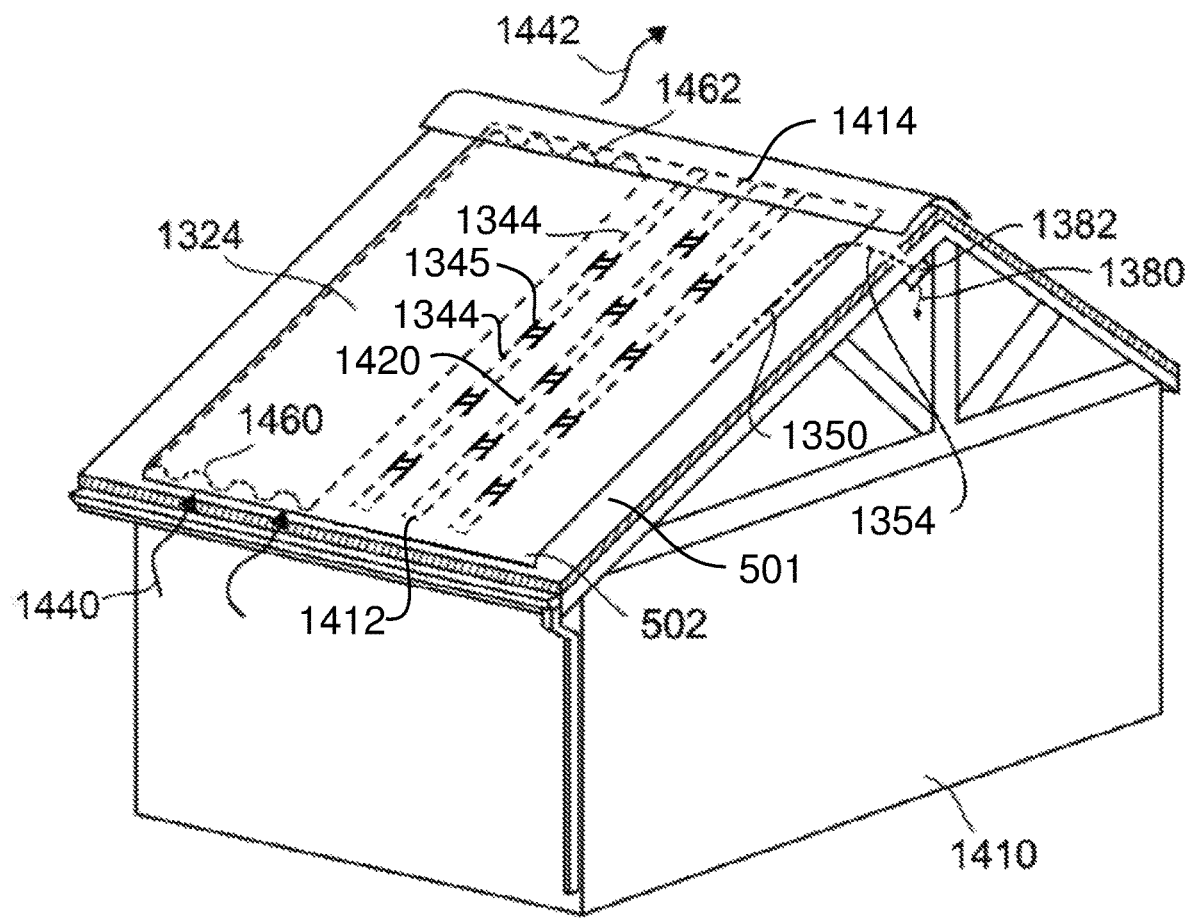
FIG. 14 is an isometric view of a building with roof with membrane.

FIG. 14 is an isometric view of a building with roof with membrane. Building 1410 is shown with roof 501. Mechanical attachment member 1420 running substantially the length of the membrane 502 from 1412 to 1414 and having multiple alternating embedded portions 1344 within the membrane 502 and extending portions 1345 extending above the membrane, wherein the extending portions 1345 each are mechanically configured for attaching a solar shingle to the roof 501. Air 1440 enters bottom 1460 of channels 1324 and exits 1442 at top of channels 1462. Electrical first portion 1350 is embedded within the membrane 502 and has an electrical third portion 1354 which is configured to electrically connect 1382 to an electrical circuit 1380.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A roofing underlayment for solar shingles comprising:
    a water-impervious membrane adapted to be attached to a roof;
    a mechanical attachment member having a mechanical first portion embedded within the membrane and having a second portion extending above the membrane, wherein the second portion of the mechanical attachment member is configured to mechanically attach solar shingles to the roof; and
    an electrical conductor having an electrical first portion of which is embedded within the membrane, having an electrical second portion which is configured to electrically connect to solar shingles, and having an electrical third portion which is configured to electrically connect to an electrical circuit;
    an air gap area that allows for air flow below solar shingles; and
    wherein the air gap area comprises an area between a bottom surface of solar shingles and a top surface of the membrane.

2. The invention of claim 1 wherein the mechanical attachment member runs substantially the length of the membrane and has multiple portions embedded within the membrane and multiple portions extending above the membrane for attaching multiple solar shingles.

3. The invention of claim 2 wherein the electrical conductor has multiple electrical portions configured to electrically connect multiple solar shingles.

4. The invention of claim 3, wherein the membrane further comprises a raised area for connecting the multiple electrical portions to the multiple solar shingles.

5. The invention of claim 2 wherein the multiple portions extending above the membrane are mechanically configured for receiving attachment members on multiple solar shingles.

6. The invention of claim 5 wherein the attachment members on the multiple solar shingles comprise electrical connection features.

7. The invention of claim 2 comprising at least a second mechanical attachment member that runs substantially the length of the membrane and parallel to the mechanical attachment member and at least a second electrical conductor that runs parallel to the electrical conductor.

8. The invention of claim 1 wherein the mechanical second portion of the mechanical attachment member and the electrical second portion of the electrical conductor are in proximity and configured so that mechanical attachment and electrical connection of the solar shingle happen simultaneously.

9. The invention of claim 1, wherein the electrical third portion of the electrical conductor comprises an insulated cable with a plug-in electrical connector for connecting to the electrical circuit.

10. The invention of claim 9 wherein the electrical third portion of the electrical conductor comprises a second plug-in electrical connector for connecting to the electrical second portion of the electrical conductor.

11. The invention of claim 1 wherein the membrane is adapted to be attached to a roof by adhesive.

12. The invention of claim 11 wherein the adhesive is a pressure-sensitive adhesive protected by a peelable layer prior to attachment to the roof.

13. The invention of claim 1, wherein the membrane has a corrugated shape creating the air gap allowing air flow.

14. The invention of claim 13, wherein the channels comprise pipes.

15. The invention of claim 1, wherein the air gap area comprises channels that run from one side of the membrane to the opposite side.

16. A roofing underlayment for solar shingles comprising:
    a water-impervious membrane adapted to be attached to a roof by adhesive;
    a mechanical attachment member running substantially the length of the membrane and have multiple alternating embedded portions within the membrane and extending portions extending above the membrane, wherein the extending portions each are configured for mechanically attaching solar shingles to the roof;
    an electrical conductor running substantially the length of the membrane and having at least a first embedded portion embedded within the membrane, having multiple connecting portions extending above the membrane configured to electrically connect to solar shingles, and having a third portion configured to plug in and electrically connect to an electrical circuit;
    wherein the connection portions and the electrical extending portions are positioned and configured so that solar shingles are mechanically attached and electrically connected simultaneously and without creating holes through the membrane; and
    an air gap area that allows for air flow below solar shingles; and
    wherein the air gap area comprises an area between a bottom surface of solar shingles and a top surface of the membrane.

17. The invention of claim 16, further comprising at least a second mechanical attachment member of similar construction and running parallel to the mechanical attachment member and at least a second electrical conductor of substantially the same construction and running parallel to the electrical conductor.

18. The invention of claim 16, wherein the multiple portions extending above the membrane are mechanically configured for receiving attachment members on multiple solar shingles.

19. The invention of claim 16, wherein the membrane is adapted to be attached to a roof by adhesive.

20. The invention of claim 16, wherein the membrane further comprises a raised area for connecting the multiple electrical extending portions to the multiple solar shingles.

* * * * *